US012669975B2

(12) United States Patent
Laroche et al.

(10) Patent No.: US 12,669,975 B2
(45) Date of Patent: Jun. 30, 2026

(54) AUDIO DEVICE WITH UNCERTAINTY QUANTIFICATION AND RELATED METHODS

(71) Applicant: GN Audio A/S, Ballerup (DK)

(72) Inventors: Clément Laroche, Ballerup (DK); Diego Caviedes Nozal, Ballerup (DK)

( * ) Notice: Subject to any disclaimer, the term of this patent is extended or adjusted under 35 U.S.C. 154(b) by 194 days.

(21) Appl. No.: 18/604,634

(22) Filed: Mar. 14, 2024

(65) Prior Publication Data

US 2024/0321281 A1      Sep. 26, 2024

(51) Int. Cl.
| | |
|---|---|
| *G06F 3/16* | (2006.01) |
| *G06N 3/08* | (2023.01) |
| *G10L 19/008* | (2013.01) |
| *G10L 19/08* | (2013.01) |

(52) U.S. Cl.
CPC .............. *G06F 3/162* (2013.01); *G06N 3/08* (2013.01); *G10L 19/008* (2013.01); *G10L 19/08* (2013.01)

(58) Field of Classification Search
CPC ........ G06F 3/162; G06N 3/08; G06N 3/0464; G06N 3/0455; G06N 3/045; G10L 19/008; G10L 19/08; G10L 21/02; G10L 25/30; G10L 25/60; G10L 21/0208
See application file for complete search history.

(56) References Cited

U.S. PATENT DOCUMENTS

| | | | |
|---|---|---|---|
| 2019/0371349 A1* | 12/2019 | Shahbazi Mirzahasanloo | ........... G10L 19/13 |
| 2021/0334656 A1* | 10/2021 | Sjögren | ........... G06F 18/22 |
| 2024/0298123 A1* | 9/2024 | Lindrup | ........... G10L 19/167 |

FOREIGN PATENT DOCUMENTS

WO      2022253999 A1      12/2022

OTHER PUBLICATIONS

Malah D et al—Tracking Speech-Presence Uncertainty to Improve Speech.
Ephraim Y et al—Speech enhancement Using a minimum meansquare error.
Jeremiah Zhe Liu et al—A Simple Approach to Improve Single_ model deep.
Huemmer Christian et al—A new uncertainty decoding scheme for DNN-HMM.

* cited by examiner

*Primary Examiner* — Yogeshkumar Patel

(57) ABSTRACT

An audio device comprising memory, an interface, and one or more processors, wherein the one or more processors are configured to obtain audio data; process the audio data for provision of an audio output; determine an uncertainty parameter based on the audio data; and control the processing of the audio data for provision of the audio output based on the uncertainty parameter.

19 Claims, 5 Drawing Sheets

100

AUDIO DEVICE WITH UNCERTAINTY QUANTIFICATION AND RELATED METHODS

BACKGROUND OF THE INVENTION

Signal processing, such as using Deep Neural Networks (DNN), along with other types of neural networks, are rapidly becoming integral components of electronic devices, such as audio devices, due to their ability to tackle previously unsolvable problems using traditional methods. With the continuous advancement and increased usage of neural networks, e.g., in audio signal processing, the reliability of their predictions is becoming increasingly important. Unfortunately, conventional neural networks do not provide reliable estimates of certainty and may suffer from over- or under-confidence, making them poorly calibrated. Thus, it may be hard to assess whether an output of a neural network is reliable, as several factors involved in the training of the neural network may lead to the output of a neural network being erroneous.

SUMMARY OF THE INVENTION

The present disclosure pertains to the field of audio devices and methods of operating audio devices, and in particular to audio devices with uncertainty quantification and related methods.

The deployment of DNN in products can be difficult due to a few factors: the lack of expressiveness and transparency of a DNN's inference model, which makes it difficult to trust its outcomes, the inability to distinguish between in-domain and out of domain samples and the sensitivity to domain shifts (generalization problem), and the inability to provide reliable uncertainty estimates for a deep neural network's decision and frequently occurring overconfident predictions.

Accordingly, there is a need for audio devices with uncertainty quantification and methods of operating an audio device, which may mitigate, alleviate, or address the short-comings existing and may provide improved uncertainty quantification and in turn improved signal processing.

An audio device is disclosed. The audio device may be configured to act as a receiver device and/or a transmitter device. The audio device comprises memory, an interface, and one or more processors. Optionally the audio device comprises one or more audio speakers and one or more microphones. The one or more processors are configured to obtain audio data. In other words, the audio device may be configured to obtain audio data using the one or more processors. The one or more processors are configured to process the audio data for provision of an audio output. In other words, the audio device may be configured to process the audio data for provision of an audio output using the one or more processors. The one or more processors are configured to determine, based on the audio data, an uncertainty parameter, e.g., indicative of an uncertainty of processing quality. In other words, the audio device may be configured to determine, based on the audio data and using the one or more processors, an uncertainty parameter indicative of an uncertainty of processing quality. The one or more processors are configured to control the processing of the audio data for provision of the audio output based on the uncertainty parameter. In other words, the audio device may be configured to control, using the one or more processors, the processing of the audio data for provision of the audio output based on the uncertainty parameter.

A method of operating an audio device is disclosed. The method comprises obtaining audio data. The method comprises processing the audio data for provision of an audio output.

The method comprises determining, based on the audio data, an uncertainty parameter, e.g., indicative of an uncertainty of processing quality. The method comprises controlling the processing of the audio data for provision of the audio output based on the uncertainty parameter.

The present disclosure provides improved determination of uncertainty parameters of processing quality, such as improved determination of uncertainty parameters of processing quality of a signal processor, e.g., a signal processor using DNN. The disclosed audio devices and related methods provide improved signal processing of input signals comprising audio, such as improved processing of audio data. In other words, the present disclosure may provide improved uncertainty parameter-based controlling of processing of audio data. It may be appreciated that the present disclosure provides informed controlling of signal processing of audio data. The present disclosure may improve the efficiency and effectiveness of signal processing, such as signal processing using DNNs. For example, the present disclosure may prevent the inadvertent filtering of audio data that was not intended to be filtered out. The present disclosure may allow to estimate an uncertainty of a processing quality, such as an uncertainty of a DNN signal processing estimate, e.g., based on a decoder output signal. Further, it may be appreciated that the present disclosure allows to quantify uncertainties in processing quality, such as DNN signal processing, which in turn allows to classify predictions and take more confident decisions for signal processing. By estimating the uncertainty of the signal processing prediction of a signal processor, such as using DNN, it may be possible to take actions when the uncertainty parameter is indicative of a high uncertainty in processing quality, e.g., when a neural network uncertainty is high. For example, it may be possible to determine a drift of an autoencoder prediction, and in turn control the processing of the audio data based on the knowledge of the drifting of the autoencoder prediction, such as regularize the processing of a digital signal processor based on the knowledge of the drifting of the autoencoder prediction. In other words, the uncertainty parameter may be indicative of a drift of an autoencoder prediction.

The present disclosure provides improved feedback on the performance of signal processing, such as using DNNs, of audio data. It may be appreciated that the present disclosure provides easier tuning and integration of neural networks, such as DNNs, in audio devices. An advantage of the present disclosure is that feedback may be provided to a machine learning, ML, engineer in charge of the training and/or optimization for a specific product, such as an audio device. For example, this may in turn help to design better products, e.g., when the uncertainty parameters are recorded as part of the data analytics process. It may be appreciated that this in turn may help to know the range of values needed to target for an optimal training of a NN, such as a DNN.

BRIEF DESCRIPTION OF DRAWINGS

The above and other features and advantages of the present disclosure will become readily apparent to those skilled in the art by the following detailed description of examples thereof with reference to the attached drawings, in which.

DETAILED DESCRIPTION OF THE INVENTION

Figure 1:
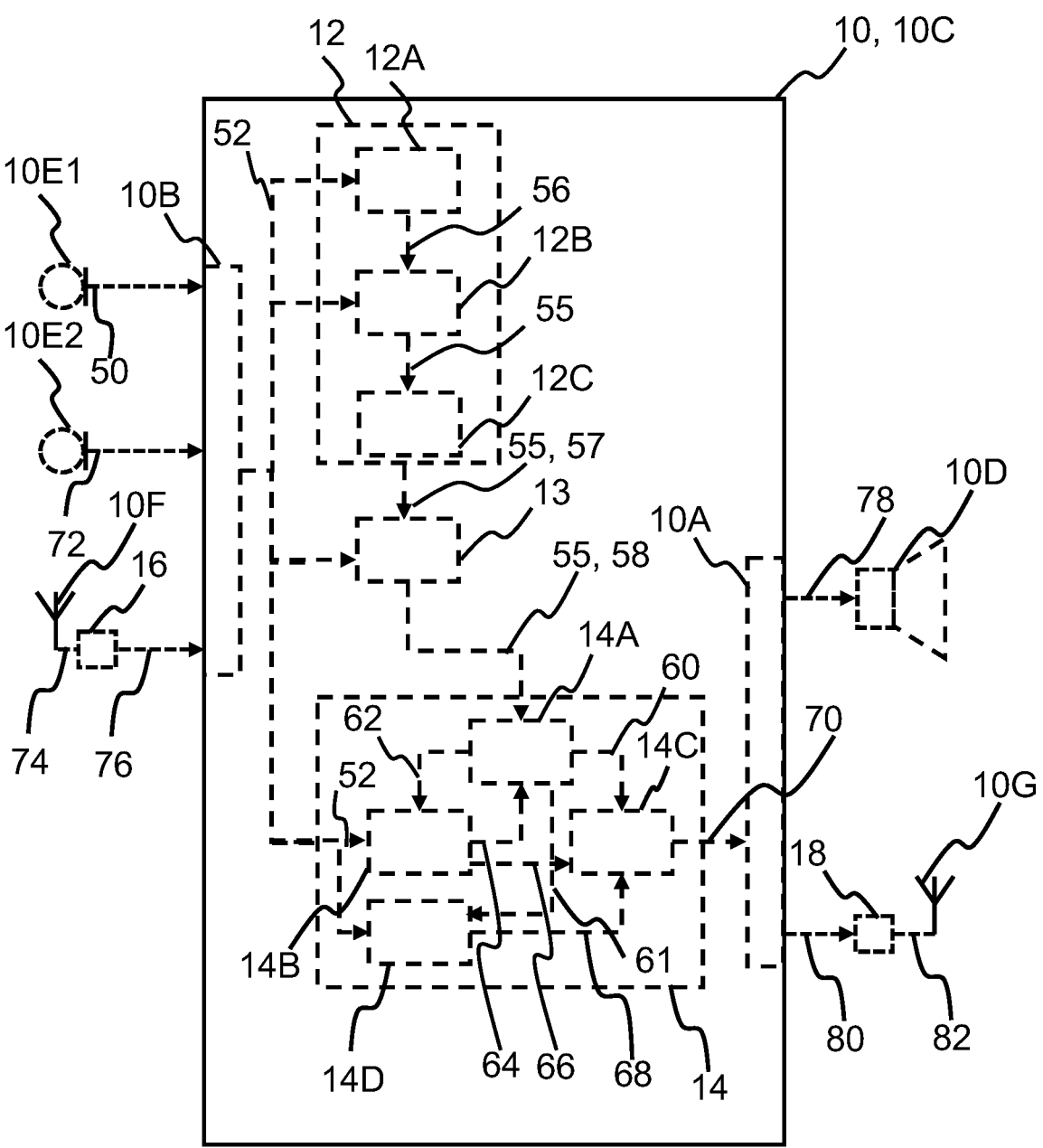
FIG. 1 schematically illustrates an example audio device according to the present disclosure, FIG. 2 schematically illustrates an example audio device according to the present disclosure where a technique as disclosed herein is applied.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

An audio device is disclosed. The audio device may be configured to act as receiver device and/or a transmitter device. In other words, the audio device is configured to receive input signals, such as audio data, from an audio device configured to act as a transmitter device or vice versa. The audio device as disclosed herein may comprise one or more interfaces, one or more audio speakers, one or more microphones, e.g., including a first microphone, one or more processors, and one or more memories. The one or more interfaces may comprise one or more of: a wireless interface, a wireless transceiver, an antenna, an antenna interface, a microphone interface, and a speaker interface.

Further, the audio device may comprise one or more microphones, such as a first microphone, optionally a second microphone, optionally a third microphone and optionally a fourth microphone. The audio device may comprise one or more audio speakers, such as audio receivers, e.g., loudspeaker(s).

The audio device may be seen as an audio device configured to obtain audio data, such as input signals, e.g., audio signals, output audio signals, and process input signals, such as audio signals. The audio device may be seen as or comprise a headset, a speakerphone, and/or a video-bar. The audio device may for example be seen as a conference audio device, e.g., configured to be used by a party (such as one or more users at a near-end) to communicate with one or more other parties (such as one or more users at a far-end). The audio device configured to act as a receiver device may also be configured to act as a transmitter device when transmitting back an output signal to the far-end. The receiver audio device and the transmitter audio device may therefore switch between being receiver audio device and transmitter audio device. The audio device may be seen as a smart audio device. The audio device may be used for a conference and/or a meeting between two or more parties being remote from each other. The audio device may be used by one or more users in a vicinity of where the audio device is located, also referred to as a near-end. The audio device may be configured to output, such as using the audio speaker and based on the input signal, an audio device output at the receiver end. The audio device output may be seen as an audio output signal that is an output of the audio speaker at a near-end where the audio device and the user(s) of the audio device are located.

The audio device may be a single audio device. The audio device may be seen as a plurality of interconnected audio devices, such as a system, e.g., an audio device system. The system may comprise one or more users.

In one or more example audio devices, the interface comprises a wireless transceiver, also denoted as a radio transceiver, and an antenna for wireless transmission and reception of an input signal, such as an audio signal, such as for wireless transmission of an output signal and/or wireless reception of a wireless input signal. The audio device may be configured for wireless communication with one or more electronic devices, such as another audio device, a smartphone, a tablet, a computer and/or a smart watch. The audio device optionally comprises an antenna for converting one or more wireless input audio signals to antenna output signal(s). The audio device system and/or the audio device, may be configured for wireless communications via a wireless communication system, such as short-range wireless communications systems, such as Wi-Fi, Bluetooth, Zigbee, IEEE 802.11, IEEE 802.15, infrared and/or the like.

The audio device system and/or the audio device, may be configured for wireless communications via a wireless communication system, such as a 3GPP system, such as a 3GPP system supporting one or more of: New Radio, NR, Narrowband IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands.

In one or more example audio device systems and/or audio devices, the interface of the audio device comprises one or more of: a Bluetooth interface, Bluetooth low energy interface, and a magnetic induction interface. For example, the interface of the audio device may comprise a Bluetooth antenna and/or a magnetic interference antenna.

In one or more example audio devices, the interface may comprise a connector for wired communication, via a connector, such as by using an electrical cable. The connector may connect one or more microphones to the audio device. The connector may connect the audio device to an electronic device, e.g., for wired connection. The connector may be seen as an electrical connector, such as a physical connector for connecting the audio device via an electrical wire to another device.

The one or more interfaces can be or comprise wireless interfaces, such as transmitters and/or receivers, and/or wired interfaces, such as connectors for physical coupling. For example, the audio device may have an input interface configured to receive data, such as a microphone input signal. In one or more example audio devices, the audio device can be used for all form factors in all types of environments, such as for headsets and/or video conference equipment. For example, the audio device may not have a specific microphone placement requirement. In one or more example audio devices, the audio device may comprise an external microphone.

The audio device is configured to obtain, such as using the one or more processors and/or via the interface, audio data. In one or more example audio devices, the audio device may be configured to obtain an input signal, such as an audio signal, from a transmitter device. In one or more example audio devices, the audio device is configured to obtain the audio data from a far-end, such as a far-end party or user(s). For example, the processor may be configured to obtain audio data via one or more microphones of the audio device, such as microphones associated with and/or comprised in the audio device. The audio data may comprise and/or be based on one or more audio signals obtained by the audio device. In other words, the transmitter device may be seen as an audio device at a far-end. The audio data may be seen as data comprising audio. In one or more embodiments or examples, the audio signal has undergone signal processing, such as encoding, compression, and/or enhancement, at the transmitter device. The audio data may be indicative of an audio signal generated by user(s) at the far-end. In other words, the audio data may be indicative of speech, such as speech from the far-end transmitter device. The audio data may be based on and/or be seen as an output signal of the transmitter device, such as of a signal processor of the transmitter device. To obtain the audio data may comprise to retrieve and/or receive the audio data. The audio data may be based on input signal(s), such as speech, from the near-end when obtained from one or more microphones, such as a first microphone and/or a second microphone, of the audio device. The audio data may be based on the input signal(s), such as based on a first microphone input signal, a second microphone input signal, and/or a transceiver input signal.

The audio device is configured to process, such as using the one or more processors, the audio data for provision of an audio output. To process the audio data for provision of an audio output may comprise to perform one or more audio processing steps of the audio data. For example, to process the audio data for provision of an audio output may comprise to perform, such as using a signal processor, noise reduction, such as background noise reduction, of the audio data, e.g., for provision of a denoised audio output. Another example may comprise to process the audio data for provision of an audio output may comprise to perform, such as using a signal processor, filtering of the audio data for provision of a filtered audio output. Further, to process the audio data for provision of an audio output may comprise to perform compression of the audio data.

In one or more examples or embodiments, the audio device is configured to process the audio data for provision of one or more audio parameters indicative of one or more characteristics of the audio data. In one or more example audio devices, the audio device comprises an uncertainty quantification determiner. The uncertainty quantification determiner may be configured to determine the one or more audio parameters. The one or more audio parameters may be seen as quality parameters of the audio data, such as indicative of audio quality of the audio data. The one or more audio parameters may for example be indicative of one or more characteristics of the audio device such as one or more of: bitrates, sample rates, dynamic ranges, frequency responses, distortion, noise levels, stereo imaging, compression artifacts, jammer, unusual noises, and voice artefacts. The one or more audio parameters may be indicative of characteristics comprising one or more of: a signal-to-noise ratio, a confidence probability map, a quality representation, or a mean opinion score. A conference probability map (Time-Frequency, T-F, map) may indicate the confidence of a denoised signal, for example the reliability of a gain time-frequency, T-F, map. The mean opinion score may be seen as a predicted mean opinion score, such as a predicted mean opinion score quality prediction. For example, the mean opinion score may be determined based on an intrusive method, e.g., by comparing the audio data with a reference signal, such as reference audio signal. Alternatively or additionally, the mean opinion score may be determined based on a non-intrusive method, e.g., by performing a blind prediction, such as using a pre-trained neural network dedicated to MOS scores and/or alternative scores estimation.

In one or more example audio devices, the one or more audio parameters comprise a direct-to-reverberation ratio (DRR), a coherence-to-diffuse ratio (CDR), a spatial noise coherence, a room impulse response, a noise/speech/jammer level/direction, a transcript of the audio of the audio data. The direct-to-reverberation ratio (DRR), coherence-to-diffuse ratio (CDR), spatial noise coherence, room impulse response, and noise/speech/jammer level/direction may be associated with the room and/or location where the transmitter is located.

In one or more example audio devices, to process the audio data for provision of one or more audio parameters comprises to encode the audio data for provision of the one or more audio parameters using the first neural network as disclosed herein. In other words, the uncertainty quantification determiner may be configured to operate according to the first neural network. The uncertainty quantification determiner may be seen as a module or a network configured to extract audio parameters, such as representative parameters, of the audio data. Formulated differently, to encode the audio data for provision of the one or more audio parameters may comprise to encode an audio signal comprised in the audio data using the first neural network for providing the one or more audio parameters. The uncertainty quantification determiner may comprise a signal feature extractor. In one or more example audio devices, to provide the one or more audio parameters comprises to extract one or more audio features from the audio data by using the signal feature extractor. For example, the audio device may be configured to extract one or more of: bitrates, sample rates, dynamic ranges, frequency responses, distortion, noise levels, stereo imaging, compression artifacts, jammer, unusual noises, voice artefacts, a signal-to-noise ratio, a confidence probability map, a quality representation, and a mean opinion score, from the audio data by using signal feature extractor. In one or more example audio devices, to provide the one or more audio parameters may comprise to encode the one or more extracted features for provision of the one or more audio parameters. The feature extractor may be configured to extract features by using ML-based methods and/or signal processing-based methods. For example, a feature may be extracted by the feature extractor by performing one or more operations on spectrograms, such as combining spectrograms.

In one or more examples or embodiments, the audio device is configured to map, such as using the one or more processors, the one or more audio parameters to a first latent space of a first neural network for provision of a mapping parameter indicative of whether the one or more audio parameters belong to a training manifold of the first latent space.

The first latent space may be seen as a mathematical representation of a multidimensional space in which data, such as audio data, may be expressed. The first latent space may be seen as multidimensional space, where data with a high degree of complexity, such as audio data, may be expressed with a lower-dimensionality while capturing the underlying structure and patterns of the data. Positions in latent space may be defined by latent variables. The first neural network may be configured to operate according to a first machine learning model. The first neural network may be trained on training audio samples to provide latent space representations of training audio samples. The dimensionality and other characteristics of the latent space may be defined during training of the first machine learning model. The first neural network may comprise an autoencoder. The auto encoder may comprise an encoder and/or a decoder. The autoencoder may be configured to generate first latent space representation of data by training the first machine learning model based on the training audio samples. In other words, the autoencoder may be configured to compress high-dimensional data of the audio data, such as highly complex training audio samples, into a lower-dimensional space, while preserving as much of the original information of the audio data as possible. In other words, the autoencoder may be configured to compress input data with a high dimensionality feature space, such as training audio samples, into a lower-dimensional space first latent space, while preserving as much of the original information of the audio data as possible while discarding irrelevant information. For example, the first neural network has been trained based on a loss between the input to the encoder, such as the audio data, e.g., the training audio data, and the output at the decoder, such as the audio output, e.g., a training audio output. The training audio data, such as the training audio samples, may be recorded and/or simulated. For example, the training audio data may be simulated by convoluting noise and pure audio data together. The encoder of the autoencoder may be trained to encode data, such as audio data, into corresponding latent space representations. The decoder of the autoencoder may be trained to decode latent space representations to try to predict the originally encoded data. The first latent space representation may be seen as a compressed representation of the input data, e.g., being audio training data, that captures the representative features of the data in a more compact form. The first latent space may be seen as a low complexity encoded space. The training manifold of the first latent space may be seen as the distribution of training data points in the first latent space that are used to train the first neural network. The training manifold may be based on the training data used in training the first neural network, such as audio training data. The training manifold may be expressed as one or more intervals defining one or more areas within the latent space. For example, each area of the training manifold may comprise a plurality of training data points encoded by the encoder. Each area of the training manifold may be associated with one or more audio parameters. In other words, each area of the training manifold may be associated with a different audio parameter classified by the first machine learning model. As the first machine learning model gets trained, the training manifold in the latent space may become more well-defined and the areas defined by the training manifold may form clusters in the latent space of training data points encoded by the encoder. The training manifold may be expressed as one or more threshold values. It may be appreciated that during training, the first neural network may be configured to learn to map each data point in the high-dimensional input feature space to a corresponding point in the lower-dimensional latent space. In other words, the first latent space comprises a training manifold of first latent space parameters. The training manifold may be seen as the representation of the set of data points in the lower-dimensional latent space that have been matched to the set of data points in the high-dimensional input space. In one or more example audio devices, the training manifold comprises a probability distribution. In other words, the training manifold is defined by a probability distribution, such as a Gaussian. In one or more example audio devices, to map the one or more audio parameters comprises to map the one or more audio parameters to the probability distribution for provision of the mapping parameter. In one or more example audio devices, the training manifold comprises a plurality of probability distributions. In other words, the training manifold may be defined by a plurality of probability distributions, such as a plurality of Gaussians, e.g., each training data point may be represented in the latent space via a Gaussian. In one or more example audio devices, to map the one or more audio parameters comprises to map the one or more audio parameters to the plurality of probability distributions for provision of the mapping parameter.

In an example, the first neural network may be trained as a variational autoencoder. The variational autoencoder may be trained with the following loss function, $$l(x, \hat{x}) = l_{reconstruction} + \beta l_{KL}(z, \mathcal{N}(0, I_d))$$

The first loss term $l_{reconstruction}$ is an estimate of how accurate the autoencoder is in reconstructing the input. In other words, the difference between the input x and the output x of the autoencoder. In one or more example audio devices, $l_{reconstruction}$ may be expressed as the mean square error between the input and the output of the autoencoder. The second loss term $l_{KL}(z, \mathcal{N}(0, I_d))$ is the Kullback-Leibler divergence between the latent variable z and a given probability distribution, which in the present example has been selected to be a gaussian distribution. It may be appreciated that other probability distributions may be equally applicable. $\beta$ may be a weighting factor between the first loss term and the second loss term. The encoder of the autoencoder may be configured to output a mean and/or a variance. The latent variable z may then be expressed as a function of the mean and/or the variance outputted by the encoder. The latent variable z may be sampled from the variance and the mean. The latent variable z may be expressed as, $$z = \epsilon \sqrt{V_x} + \mu_x$$

where $\mu_x$ is the mean outputted from the encoder as a result of the sample x, V is the variation outputted from the encoder as a result of the sample x, and e may be considered as sample noise following a gaussian distribution such as $\mathcal{N}(0,1)$. During training one or more vectors comprising a plurality of mean values and/or variance values may be created. The training manifold may then be defined based on the plurality of mean values and/or variance values. The mean values and/or the variance values may be viewed as latent space parameters. The training manifold may be defined based on the trained one or more vectors. The training manifold may be defined based on one or more mean vectors comprising each comprising a plurality of mean values and/or one or more variance vectors each comprising a plurality of variance values. For example, the training manifold may be defined based on maximum and/or minimum values of the mean values and/or the variance values. Alternatively or additionally, the training manifold may be defined based on a percentile of the mean values and/or variance values.

In one or more example audio devices, the one or more audio parameters may comprise the mean, the variance, and/or the latent variable.

To map the one or more audio parameters to the first latent space may be seen as mapping the one or more audio parameters to the training manifold. In other words, by mapping the one or more audio parameters to the first latent space, the audio device, such as using the one or more processors, may determine whether the one or more audio parameters belong to the training manifold or not for provision of the mapping parameter. The mapping parameter may indicate whether the one or more audio parameters are inside the training conditions, such as inside the training manifold, of the first latent space or not. In other words, to map the one or more audio parameters to the first latent space may be seen as mapping the one or more audio parameters to the lower-dimensional latent space. For example, whether the one or more characteristics of the audio data are similar to characteristics of the training audio data used to provide the first latent space.

In one or more example audio devices, to map the one or more audio parameters with a first latent space of a first neural network comprises to determine a distance between the one or more audio parameters and the training manifold. For example, to determine a distance between the one or more audio parameters and the training manifold may comprise to determine a distance between the one or more audio parameters and the probability distribution of the training manifold. To determine a distance between the one or more audio parameters and the training manifold may comprise to determine a variance of the one or more audio parameters with respect to the training manifold. To determine a distance between the one or more audio parameters and the training manifold may comprise to determine a mean of the one or more audio parameters with respect to the training manifold. For example, the one or more audio parameters may be seen as being outside of the training manifold when the one or more audio parameters lie outside the variance and/or mean of the probability distribution of the training manifold.

To determine a distance between the one or more audio parameters and the training manifold may comprise to determine a distance between the one or more audio parameters and the set of points of the lower-dimensional latent space.

Based on as described herein may be seen as "a function of" and/or "used as an input to". For example, the mapping parameter may be a function of the one or more audio parameters and/or the one or more audio parameters may be used as an input to determine the mapping parameter.

The audio device is configured to determine an uncertainty parameter based on the audio data.

For example, the audio device may be configured to determine an uncertainty parameter based on one or more characteristics of the audio data as described herein. In one or more examples or embodiments, the audio device may be configured to determine an uncertainty parameter based on one or more audio parameters as disclosed herein. In other words, the audio device is configured to determine an uncertainty parameter indicative of an uncertainty in estimating processing quality of the audio data by the audio device for provision of the audio output. The uncertainty parameter may be indicative of an estimate of the quality of the outcome of the processing of the audio data, such as an estimate of the quality of the audio output. For example, the uncertainty parameter may be indicative of an estimate of the quality of the outcome of the processing of the audio data by the digital signal processor as disclosed herein. Formulated differently, the uncertainty parameter may be indicative of an uncertainty of prediction of the processing of the audio data by the digital signal processor as disclosed herein. For example, the uncertainty parameter may be indicative of an uncertainty of prediction of the processing of the audio data by the digital signal processor using the second neural network as disclosed herein. In other words, the uncertainty parameter may be indicative of an estimate of a reconstruction quality of the outcome of the processing of the audio data, such as an estimate of a reconstruction quality of the audio output, compared to the original audio signal that the audio data is based on. For example, when the audio data is based on an audio signal being similar to the training audio signals, the uncertainty parameter may indicate that the processing quality of the audio data will result in a good reconstruction quality compared to the original audio signal that the audio data is based on. On the other hand, when the audio data is based on an audio signal being different to the training audio signals, the uncertainty parameter may indicate that the processing quality of the audio data will result in a poor reconstruction quality compared to the original audio signal that the audio data is based on. The uncertainty parameter may be seen as a prediction of processing quality of the audio data by the audio device. The uncertainty parameter may be seen as an estimate of how confident the audio device is on the processing quality when using the digital signal processor, such as the second neural network, for a given input, e.g., for given audio data. For example, the uncertainty parameter may be seen as an estimate of the confidence of the processing quality by the second neural network for a given input, such as for given audio data. Nevertheless, an uncertainty parameter indicative of a high uncertainty of processing quality may result in a good processing quality of the audio data and vice versa an uncertainty parameter indicative of a low uncertainty of processing quality may result in a poor processing quality of the audio data.

In one or more examples or embodiments, the audio device is configured to determine, based on the mapping parameter, an uncertainty parameter indicative of an uncertainty of processing quality.

For example, the uncertainty parameter may be a function of the mapping parameter and/or the one or more audio parameters. In other words, the mapping parameter and/or the one or more audio parameters may be used as an input to determine the uncertainty parameter.

The audio device is configured to control the processing of the audio data for provision of the audio output based on the uncertainty parameter. In other words, the audio device is configured to control, based on the uncertainty parameter, the processing of the audio data by the one or more processors. For example, the audio device is configured to control, based on the uncertainty parameter, the processing of the audio data by the digital signal processor as disclosed herein, e.g., using the second neural network as disclosed herein. It may be appreciated that the processing of the audio data may be varied, such as adapted, depending on the uncertainty parameter. By controlling the processing of the audio data based on the uncertainty parameter, the present disclosure may improve the quality of processing and in turn the quality of the audio output. For example, the present disclosure may improve the reconstruction quality of the audio data and in turn improve the audio quality of the audio output. For example, when signal processing is performed in conditions which are outside of training conditions, the performance of the signal processing may be reduced. This could induce a lower speech quality, difficulty to hear the other end, and an overall a degraded experience. When a certain level of uncertainty in the processing quality has been identified, the audio device may control the processing, such as the signal path, to rely less on the signal processing, e.g., using neural network prediction. Instead, the audio device may be configured to perform a more conservative signal processing using the neural network and for example provide some feedback to the user, such as report data on the condition that caused problem to the signal processing.

In one or more example audio devices, the one or more processors comprise an encoder and a decoder.

An encoder as disclosed herein, may be implemented as hardware and/or software on the audio device. An encoder as disclosed herein may be seen as a module configured to convert and/or encode audio data, such as an audio input signal, to a compressed encoder output signal. In other words, an encoder may be configured to compress an input signal, such as an input signal from a transmitter device and/or a near-end input signal obtained via one or more microphones of the audio device. For example, an encoder may be configured to convert and/or encode an input signal from a transmitter device and/or a near-end input signal obtained via one or more microphones of the audio device to a compressed encoder output signal. It may be appreciated that the encoder may be an encoder of an autoencoder as disclosed herein.

In one or more example audio devices, the one or more processors comprise an autoencoder. In one or more example audio devices, the autoencoder comprises the encoder and the decoder as disclosed herein.

In one or more example audio devices, to process the audio data for provision of the compressed encoder output signal comprises to encode the audio data. For example, to process the audio data for provision of the compressed encoder output signal comprises to encode the audio data using one or more codecs and/or one or more encoder parameters. In one or more example audio devices, to process the audio data for provision of the compressed encoder output signal comprises to encode the audio data using one or more of: a codec type, a sampling rate, and a bit rate.

In one or more example audio devices, to process the compressed encoder output signal comprises to decode the compressed encoder output signal for provision of the decoder output signal. For example, to process the compressed encoder output signal comprises to decode the compressed encoder output signal for provision of the decoder output signal comprises to decode the encoder output signal using one or more decoder parameters. In one or more examples or embodiments, to process the compressed encoder output signal comprises to decode the compressed encoder output signal for provision of the decoder output signal comprises to decode the encoder output signal based on one or more of: a codec type, a sampling rate, and a bit rate.

In one or more examples or embodiments, to process the audio data for provision of an audio output comprises to process, using the encoder, the audio data for provision of a compressed encoder output signal. The audio data may be seen as an encoder input signal. For example, when the encoder is an encoder of an autoencoder, the audio device may be configured to process an autoencoder input signal based on the audio data.

A decoder as disclosed herein, may be implemented as hardware and/or software on the audio device. A decoder as disclosed herein may be seen as a module configured to convert and/or decode an input signal from a transmitter device and/or an encoder output signal from the encoder to a decoder output signal. The encoder output signal may be seen as a decoder input signal. In other words, a decoder may be configured to decompress an input signal from a transmitter device and/or an encoder output signal from the encoder. For example, a decoder may be configured to convert and/or decode an input signal from a transmitter device and/or an encoder output signal from the encoder to an audio signal.

In one or more examples or embodiments, the encoder and/or the decoder are configured to operate according to a first neural network, such as a first neural network as disclosed herein.

In one or more examples or embodiments, the one or more processors are configured to process, using the decoder, the compressed encoder output signal for provision of a decoder output signal.

In one or more examples or embodiments, to determine an uncertainty parameter based on the audio data comprises to determine an uncertainty parameter based on the audio data and the decoder output signal by comparing the audio data and the decoder output signal. In other words, to determine an uncertainty parameter based on the audio data and the decoder output signal may comprise comparing an audio input signal as disclosed herein with the decoder output signal. Comparing the audio data and the decoder output signal may be seen as comparing one or more audio parameters of the audio data with one or more audio parameters of the decoder output signal. For example, comparing the audio data and the decoder output signal may comprise determining a distance between each datapoint of an amplitude-frequency dataset between the audio data and the decoder output signal, to determine the uncertainty parameter.

In one or more example audio devices, the one or more processors comprise a comparator processor. In one or more example audio devices, to determine the uncertainty parameter comprises to determine the uncertainty parameter using the comparator processor. For example, to determine the uncertainty parameter comprises to compare the audio data and the decoder output signal using the comparator processor. In other words, the comparator processor may be configured to compare features of the audio data with features of the decoder output signal.

In one or more example audio devices, the one or more processors comprise a digital signal processor comprising a second neural network. The digital signal processor may be configured to operate according to the second neural network.

In one or more examples or embodiments, the digital signal processor is a regular digital signal processor that does not comprise the second neural network.

In other words, the one or more processors, such as the digital signal processor, may comprise a second machine learning engine configured to operate according to a second machine learning model. The second machine learning engine may be seen as a predictor engine configured to operate according to a second prediction model. The second machine learning engine may be configured to process, based on the uncertainty parameter, the audio data using the second neural network. The second machine learning model may for example comprise or make use of a neural network, artificial intelligence, deep learning, and/or machine learning, such as the second neural network. The second machine learning model may be seen as a model for signal processing. In one or more example audio devices, the second neural network may use the same or a similar training manifold as the first neural network. By using the same or a similar training manifold the first neural network may be used to determine the uncertainty parameter for the processing of the digital signal processor with the second neural network. In one or more example audio devices, the second neural network may have been trained on the same training data as the first neural network. By using the same training data the first neural network may be used to determine the uncertainty parameter for the processing of the digital signal processor with the second neural network.

The one or more processors, such as the second neural network, may be configured to remove an abnormal portion of the audio data and/or fixate the digital signal processor using the second neural network instead of adapting to an abnormal situation that may occur when applying a neural network. For example, the one or more processors, such as the second neural network, may be configured to fixate one or more processing parameters of the digital signal processor using the second neural network instead of adapting to an abnormal situation that may occur when applying a neural network.

In one or more example audio devices, the second machine learning model comprises model layers including an input layer, one or more intermediate layers, and an output layer for processing of the audio data, such as the audio input signal. In other words, the input layer, the one or more intermediate layers, and/or the output layer may be seen as layers of the second machine learning model such as layers of the second neural network. The one or more intermediate layers may be considered as hidden layers (such as hidden features). The one or more intermediate layers may include a first intermediate layer. A model as referred to herein (such as the second machine learning model) may be seen as a model and/or a scheme and/or a mechanism and/or a method configured to process, based on the uncertainty parameter (such as based on one or more processing schemes) and/or a previous model, the audio data.

In one or more example audio devices, a model as referred to herein may be stored on a non-transitory storage medium (for example, on the memory of the audio device). The model may be stored on a non-transitory storage medium of the audio device being configured to execute the model. In one or more example audio devices, the model may comprise model data and or computer readable instructions (for example based on the uncertainty parameter and/or the processing schemes as disclosed herein). The model data and/or the computer readable instructions may be used by the audio device. The model (such as model data and/or the computer readable instructions) may be used by the audio device to process the audio data, such as the audio input signal.

In one or more example audio devices, to process the audio data for provision of an audio output comprises to provide the audio data as input to the second neural network and to process the audio data using the second neural network for provision of a primary output based on the uncertainty parameter. In other words, the processing of the audio data using the second neural network may be controlled based on the uncertainty parameter. It may be appreciated that the processing of the audio data using the second neural network may be varied, such as adapted, depending on the uncertainty parameter.

For example, when the uncertainty parameter is indicative of an estimate of poor processing quality, the digital signal processor, such as the second neural network, may not be used to perform noise reduction since it may compromise the audio data. The audio device, such as the digital signal processor using the second neural network, may compromise the audio data by needlessly introducing artefacts and other processing defects into the processing of the audio data. The audio device, such as the digital signal processor using the second neural network, may compromise the input signal by removing regions of the audio data having high signal-to-noise ratio and/or high mean opinion score and try to regenerate these regions.

For example, in an audio device, such as a headset, the digital signal processor may use a second neural network in the signal path to provide a mask to guide an adaptive beamformer and/or to filter out residual noise from the audio data. The second neural network may predict a mask at each frame that updates the direction of the beam. When the uncertainty parameter is indicative of an estimate of poor processing quality, such as a high uncertainty in prediction is identified, the digital signal processor, such as the second neural network, may be controlled not to update covariance matrices, hence preventing the beamformer to oscillate and preserve a speech quality. Furthermore, the second neural network may predict a mask for the residual noise of the audio data. When the uncertainty parameter is indicative of an estimate of poor processing quality of processing, such as a high uncertainty in prediction is identified, the digital signal processor, such as the second neural network, may be controlled to only apply a partial noise reduction to preserve the voice of the user. Partial noise reduction may be seen as reducing noise from the audio data without completely removing it, e.g., for avoiding distortion of the audio data and/or introducing artefacts in the processed audio data, such as audio output. For example, it may be determined that the digital signal processor may only perform noise reduction on parts of the audio data and no noise reduction or conventional noise reduction may be performed on other parts of the audio data.

For example, the digital signal processor may comprise a denoiser and/or an echo controller, such as a deep noise reduction, DNS, denoiser configured to operate according to a neural network, NN, such as a DNN. To control the processing of the audio data, e.g., by the digital signal processor, based on the uncertainty parameter may comprise removing and/or reducing the masking of regions of a Time-Frequency, T-F, spectrum of the audio data and let the entire audio data (e.g., a speech signal including noise) through in the regions where the signal-to-noise ratio and/or higher mean opinion score is high. For example, for audio data being different from the training audio data, the audio device, such as the digital signal processor, may not need to perform noise reduction since it may compromise the audio data by removing too much of the audio signal, or by introducing processing artefacts.

In one or more example audio devices, the audio output is based on the primary output. In other words, the primary output from the digital signal processor may be used as an input for provision of the audio output. The audio output may be based on the primary output directly, mixed with one or more other outputs, and/or filtered.

In one or more example audio devices, the second neural network comprises a deep neural network, DNN. In other words, the audio device, such as the digital signal processor, may be configured to operate according to the DNN.

In one or more example audio devices, the digital signal processor comprises a controller configured to determine a controller output based on the uncertainty parameter. In other words, the controller may be configured to receive the uncertainty parameter and to determine the controller output based on the uncertainty parameter.

In one or more example audio devices, to control the processing of the audio data for provision of the audio output comprises to control the processing of the audio data based on the controller output. In other words, the controller output may be used as an input to the processing of the audio data for provision of the audio output.

The controller may be configured to use the uncertainty parameter, to determine a controller output. To determine the controller output may comprise to determine a processing scheme for the processing of the audio data. For example, the controller may be configured to determine whether the audio data is to be processed more or less by the audio device, such as by the signal processor.

In one or more example audio devices, the one or more processors comprise a secondary processor different from the digital signal processor. The secondary processor may be seen as an alternative processor, such as a secondary signal processor different from the digital signal processor using the second neural network. For example, the secondary processor may be configured to perform signal processing without using a neural network, e.g., using conventional signal processing instead. The secondary processor may be configured as a different signal processing path in the audio device, such as a secondary signal processing path. The digital signal processor may be seen as a primary signal processing path. In one or more example audio devices, the digital signal processor and the secondary processor are comprised in the same processor. In other words, the digital signal processor may comprise both the digital signal processor as disclosed herein and the secondary processor. In one or more example audio devices, the digital signal processor and the secondary processor are comprised in different processors.

In one or more example audio devices, to process the audio data for provision of an audio output comprises to process the audio data for provision of a secondary output different from the primary output using the secondary processor, wherein the audio output is based on the secondary output. In one or more example audio devices, the secondary output is determined based on the uncertainty parameter. In other words, the secondary output may be used as an input to the processing of the audio data for provision of the audio output.

In one or more example audio devices, the one or more processors comprise a mixer. In one or more example audio devices, to process the audio data for provision of an audio output comprises to mix the primary output and the secondary output for provision of a mixed output. In one or more example audio devices, to control the processing of the audio data may comprise to mix the primary output and the secondary output for provision of a mixed output. For example, the mixer may be configured to combine the primary output with the secondary output, e.g., with different weights, for provision of the mixed output. The mixer may for example be configured to add the primary output to the secondary output, e.g., with different weights, for provision of the mixed output. The controller may be configured to control how the mixer should mix the primary output and the secondary output. For example, the mixer may be configured to apply a mask-method partially. It may be appreciated that the mixing of the primary output and the secondary output may be weighted adaptively between the first criterion and second criterion as disclosed herein. For example, when the uncertainty parameter fluctuates between the first criterion and the second criterion the mixing of the primary output and the secondary output may be weighted adaptively between the first criterion and second criterion.

In one or more example audio devices, the audio output is based on the mixed output.

In one or more example audio devices, the audio output is based partly on the primary output and partly on the secondary output. For example, a first part of the audio output is based on the primary output and a second part of the audio output is based on the secondary output. In other words, the digital signal processor may be configured to process sub-parts of the audio data for provision of the primary output and/or the secondary processor may be configured to process sub-parts of the audio data for provision of the secondary output.

In one or more example audio devices, the controller may be configured to determine, based on the uncertainty parameter, which parts of the audio data are to be processed by digital signal processor and which parts of the audio data are to be processed by the secondary processor. By mixing the primary output and secondary output, the audio device may be configured to combine a conventional noise reduction with neural network approach.

In one or more example audio devices, the one or more processors are configured to output the audio output via the interface. In other words, the audio device may be configured to output the audio output via the wired and/or wireless interface such as to a far-end, and/or via the one or more speakers (such as receivers) at the near-end on the audio device itself.

In one or more example audio devices, the one or more processors are configured to determine whether the uncertainty parameter satisfies a first criterion. The first criterion may be seen as a criterion indicating when the uncertainty parameter is indicative of a low uncertainty of processing quality, such as a low uncertainty in estimating processing quality of given audio data. In other words, when the first criterion is satisfied, the uncertainty parameter is indicative of an estimate of processing quality resulting in a good reconstruction quality of the audio data. The first criterion may comprise a first threshold. In one or more example audio devices, in accordance with the uncertainty parameter satisfying the first criterion, the one or more processors are configured to process the audio data according to a first signal processing scheme for provision of the audio output. It may be appreciated that the first criterion is satisfied when the uncertainty parameter is above or equal to the first threshold. For example, the uncertainty parameter may satisfy the first criterion when the one or more audio parameters belong to the training manifold. For example, the uncertainty parameter may satisfy the first criterion when the one or more audio parameters are located within a certain distance, such as a first distance, from the training manifold. In one or more example audio devices, the uncertainty parameter may satisfy the first criterion when the one or more audio parameters are within the probability distribution of the training manifold, such as within a certain part of the probability distribution. To process the audio data according to a first signal processing scheme for provision of the audio output may comprise to process the audio data using the digital signal processor, such as using the second neural network, for provision of the audio output. In other words, the first signal processing scheme may comprise instructions instructing the audio device to process the audio data with the digital signal processor using the second neural network, such as processing using only with the digital signal processor, e.g., using only the DNN. The first signal processing scheme may be seen as the normal operation.

In one or more example audio devices, in accordance with the uncertainty parameter not satisfying the first criterion and/or in accordance with the uncertainty parameter satisfying a second criterion, the one or more processors are configured to process the audio data according to a second signal processing scheme for provision of the audio output. In other words, the one or more processors are configured to determine whether the uncertainty parameter satisfies a second criterion. For example, when the uncertainty parameter does not satisfy the first criterion, the audio device may be configured not to update the covariance matrices and hence preventing a beamformer of the audio device to oscillate (e.g., due to error in the prediction of the uncertainty parameter) and in turn preserving the speech quality of the audio data.

The second criterion may be seen as a criterion indicating when the uncertainty parameter is indicative of a medium uncertainty of processing quality. In other words, when the second criterion is satisfied, the uncertainty parameter is indicative of a medium uncertainty of processing quality, such as indicative of a medium reconstruction quality of the audio data. The second criterion may comprise a second threshold.

It may be appreciated that the second criterion is satisfied when the uncertainty parameter is above or equal to the second threshold. For example, the uncertainty parameter may satisfy the second criterion when the one or more audio parameters are located within a certain distance, such as a second distance, from the training manifold. In one or more example audio devices, the uncertainty parameter may satisfy the second criterion when the one or more audio parameters are within a certain distance from the probability distribution of the training manifold.

It may be appreciated that the first criterion is not satisfied when the uncertainty parameter is below the first threshold. For example, the uncertainty parameter may not satisfy the first criterion when the one or more audio parameters are located outside a certain distance, such as outside the first distance, from the training manifold. In one or more example audio devices, the uncertainty parameter may not satisfy the first criterion when the one or more audio parameters are outside a certain distance from the probability distribution of the training manifold. It may be appreciated that when the uncertainty parameter does not satisfy the first criterion, the audio device is configured to refrain from processing the audio data according to the first signal processing scheme.

To process the audio data according to a second signal processing scheme for provision of the audio output may comprise to process the audio data using a combination of the digital signal processor, such as using the second neural network, and the secondary processor for provision of the audio output. In other words, the second signal processing scheme may comprise instructions instructing the audio device to process the audio data with the digital signal processor using a combination of the second neural network and the second processor, such as processing using both the digital signal processor, e.g., using the DNN, and the secondary processor. The second signal processing scheme may be seen as a conservative operation.

In one or more example audio devices, in accordance with the uncertainty parameter not satisfying the first criterion and in accordance with the uncertainty parameter not satisfying the second criterion, the one or more processors are configured to process the audio data according to a third signal processing scheme for provision of the audio output.

It may be appreciated that the second criterion is not satisfied when the uncertainty parameter is below the second threshold. For example, the uncertainty parameter may not satisfy the second criterion when the one or more audio parameters are located outside a certain distance, such as outside the second distance, from the training manifold. In one or more example audio devices, the uncertainty parameter may not satisfy the second criterion when the one or more audio parameters are outside a certain distance from the probability distribution of the training manifold. It may be appreciated that when the uncertainty parameter does not satisfy the second criterion, the audio device is configured to refrain from processing the audio data according to the second signal processing scheme. When the first criterion and the second criterion are not satisfied, the uncertainty parameter may be indicative of a high uncertainty of processing quality. In other words, when the first criterion and the second criterion are not satisfied, the uncertainty parameter is indicative of a high uncertainty of processing quality, such as indicative of a poor reconstruction quality of the audio data.

To process the audio data according to a third signal processing scheme for provision of the audio output may comprise to process the audio data using the secondary processor for provision of the audio output. In other words, the third signal processing scheme may comprise instructions instructing the audio device to process the audio data only with the secondary processor. The third signal processing scheme may be seen as a very conservative operation.

It may be appreciated that when the uncertainty parameter does not satisfy the first criterion and the uncertainty parameter does not satisfy the second criterion, the audio device may be configured to remove an abnormal portion of the audio data and/or fixate the digital signal processor using the second neural network instead of adapting to an abnormal situation that may occur when applying a neural network. For example, the one or more processors, such as the second neural network, may be configured to fixate one or more processing parameters (such as lock values for the digital signal processor) of the digital signal processor using the second neural network instead of adapting to an abnormal situation that may occur when applying a neural network.

A method of operating an audio device, such as an audio device configured to act as a receiver device, is disclosed. The method comprises obtaining, such as via an interface and/or using one or more processors of the audio device, audio data. The method comprises processing, such as using one or more processors of the audio device, the audio data for provision of an audio output. The method comprises determining, such as using the one or more processors of the audio device, an uncertainty parameter based on the audio data. The method comprises controlling, such as using one or more processors of the audio device, the processing of the audio data for provision of the audio output based on the uncertainty parameter.

In one or more examples or embodiments, the method comprises processing, such as using one or more processors of the audio device, the audio data for provision of one or more audio parameters indicative of one or more characteristics of the audio data. In one or more examples or embodiments, the method comprises mapping, such as using one or more processors of the audio device, the one or more audio parameters to a first latent space of a first neural network for provision of a mapping parameter indicative of whether the one or more audio parameters belong to a training manifold of the first latent space. In one or more examples or embodiments, the method comprises determining, such as using one or more processors of the audio device, based on the mapping parameter, an uncertainty parameter indicative of an uncertainty of processing quality.

It is to be understood that a description of a feature in relation to the audio device is also applicable to the corresponding feature in the method(s) of operating an audio device as disclosed herein and vice versa.

FIG. 1 schematically illustrates an example audio device, such as an audio device 10 according to the present disclosure. The audio device 10 may be seen as an audio communication device. The audio device 10 may be seen as a communication device for performing calls, such as audio and/or video calls. The audio device 10 may be seen as an audio device with uncertainty quantification-based processing.

The audio device 10 may be configured to act as a receiver device and/or a transmitter device. In other words, the audio device 10 may be configured to receive input signals from other audio devices configured to act as transmitter devices and/or configured to transmit output signals to other audio devices. The audio device 10 comprises an interface and a memory, (not shown). Optionally, the audio device 10 comprises an audio speaker 10D, and one or more microphones, such as a first microphone 10E1 and a second microphone 10E2. Optionally, the audio device 10 comprises one or more transceivers, such as a first wireless transceiver 10F and/or a second wireless transceiver 10G. The audio device 10 may be seen as an audio device configured to obtain audio signals, output audio signals, and process audio signals. The audio device 10 may be seen as a conference audio device, e.g., configured to be used by a party (such as one or more users at a near-end) to communicate with one or more other parties (such as one or more users at a far-end). The audio device 10 may be seen as a smart audio device. The audio device 10 may be used for communication, conference, and/or a meeting between two or more parties being remote from each other. The audio device 10 may be used by one or more users in a vicinity of where the audio device 10 is located, also referred to as a near-end. In the present examples, the receiver end may be seen as the near-end and the transmitter end may be seen as the far-end.

The audio device 10 comprises one or more processors 10C. The one or more processors 10C are configured to obtain audio data. The audio device 10 may be configured to obtain, such as using the one or more processors 10C and/or via an input interface 10B, a first microphone input signal 50 from the first microphone 10E1, a second microphone input signal 72 from the second microphone 10E2, and/or a transceiver input signal 74 from the first transceiver. The first microphone input signal 50, the second microphone input signal 72, and/or the transceiver input signal 74 may be seen as input signals. In one or more example audio devices, the transceiver input signal 74 may be obtained via a first transceiver interface 16, e.g., as a transceiver interface input signal, and forwarded to the input interface 10B as a transceiver interface output 76. In one or more example audio devices, the audio device 10 is configured to obtain the input signal(s), such as the transceiver input signal 74, from a far-end, such as a far-end party or user(s). It may be appreciated that the input signal(s) comprises audio. In one or more embodiments or examples, the input signal(s), such as the transceiver input signal 74, has undergone signal processing, such as encoding, compression, and/or enhancement. The transceiver input signal 74 may be indicative of an audio signal generated by user(s) at the far-end. In other words, the transceiver input signal 74 may be indicative of speech, such as speech from a far-end transmitter device. The input signal(s) may be indicative of audio, such as speech, from the near-end when obtained from the first microphone 10E1 and/or the second microphone 10E2. The audio data may be based on the input signal(s), such as based on the first microphone input signal 50, the second microphone input signal 72, and/or the transceiver input signal 74. The input interface 10B may be configured to provide an input interface output 52 based on the first microphone input signal 50, the second microphone input signal 72, and/or the transceiver input signal 74. The audio data may be based on the input interface output 52.

The audio device 10 is configured to process, such as using the one or more processors 10C, the audio data for provision of an audio output. In other words, the audio device 10 is configured to process the first microphone input signal 50, the second microphone input signal 72, the transceiver input signal 74, and/or the input interface output 52 for provision of the audio output. The audio device 10 may comprise an output interface 10A configured to output the audio output. For example, the audio device 10 may be configured to output the audio output via the output interface 10A to the audio speaker 10D as an audio speaker input 78. The audio speaker 10D may be configured to output the audio output based on the audio speaker input 78, e.g., to output the audio output at the near-end. For example, the audio device 10 may be configured to output the audio output via the output interface 10A to the second wireless transceiver 10G as a second transceiver input 80. The second wireless transceiver 10G may be configured to output the audio output based on the second transceiver input 80, e.g., to output the audio output to the far-end. In one or more example audio devices, the second transceiver input 80 may be outputted via a second transceiver interface 18, e.g., as a second transceiver interface input signal, and forwarded to the second wireless transceiver interface 10G as a second transceiver output 82. It may be appreciated that the audio output may be based on and/or comprise the audio speaker input 78 and/or the second transceiver input 80.

The audio device 10 is configured to determine an uncertainty parameter based on the audio data. In one or more examples or embodiments, the audio device 10 is configured to process, such as using the one or more processors 10C, the audio data for provision of one or more audio parameters indicative of one or more characteristics of the audio data. In one or more example audio devices, the audio device 10 comprises an uncertainty quantification determiner 12. The uncertainty quantification determiner 12 may be configured to determine the uncertainty parameter based on audio data.

In one or more examples or embodiments, the one or more processors 10C comprise an encoder 12A and a decoder 12C. In one or more examples or embodiments, to process the audio data for provision of an audio output comprises to process, using the encoder 12A, the audio data for provision of a compressed encoder output signal 56. The audio data may be seen as an encoder input signal 52. For example, when the encoder is an encoder of an autoencoder, the audio device 10 may be configured to process an autoencoder input signal based on the audio data. In one or more examples or embodiments, the uncertainty quantification determiner 12 may be seen as or comprise an autoencoder. In one or more examples or embodiments, the one or more processors 10C are configured to process, using the decoder 12C, the compressed encoder output signal 56 for provision of a decoder output signal 57. Optionally, the one or more processors 10C are configured to process, using the decoder 12C, the uncertainty parameter determiner output 55 for provision of a decoder output signal 57.

In one or more examples or embodiments, to determine an uncertainty parameter based on the audio data comprises to determine an uncertainty parameter based on the audio data and the decoder output signal 57 by comparing the audio data and the decoder output signal 57. In other words, to determine an uncertainty parameter based on the audio data and the decoder output signal 57 may comprise to compare the input interface output (such as the encoder input signal 52) and the decoder output signal 57.

In one or more example audio devices, the one or more processors comprise an autoencoder 12. In one or more example audio devices, the autoencoder 12 comprises the encoder 12A and the decoder 12C as disclosed herein.

In one or more example audio devices, to process the audio data for provision of the compressed encoder output signal 56 comprises to encode the audio data.

In one or more example audio devices, to process the compressed encoder output signal 56 comprises to decode the compressed encoder output signal 56 for provision of the decoder output signal 57. The autoencoder 12 may be configured to output 57 the decoder output signal. The autoencoder 12 may be configured to operate according to a first neural network as disclosed herein.

In one or more example audio devices, the one or more processors 10C comprise a comparator processor 13. In one or more example audio devices, to determine the uncertainty parameter comprises to determine the uncertainty parameter using the comparator processor 13. For example, to determine the uncertainty parameter comprises to compare the audio data and the decoder output signal 57 using the comparator processor 13. In other words, the comparator processor 13 may be configured to compare features of the audio data with features of the decoder output signal 57. The comparator processor 13 may be configured to output 58 the uncertainty parameter, such as output 58 the uncertainty parameter to the signal processor 14 (e.g., to the controller 14A). The comparator processor 13 may be configured to receive the input interface output 52 (e.g., comprising the audio data).

Optionally, the uncertainty quantification determiner 12 may be seen as or comprised in the comparator processor 13.

The uncertainty quantification determiner 12 may be configured to determine or provide the one or more audio parameters. The one or more audio parameters may be seen as quality parameters of the audio data, such as indicative of audio quality of the audio data. For example, the uncertainty quantification determiner 12 may comprise an encoder 12A configured to determine the one or more audio parameters, e.g., by encoding the audio data. The uncertainty quantification determiner 12 may be configured to determine, such as using the encoder 12A, the one or more audio parameters based on the input interface output 52. In one or more example audio devices, to process the audio data for provision of one or more audio parameters comprises to encode the audio data for provision of the one or more audio parameters using the first neural network as disclosed herein. In other words, the uncertainty quantification determiner 12 may be configured to operate according to the first neural network. For example, the encoder 12A may be configured to operate according to the first neural network. The uncertainty quantification determiner 12 may be seen as a module or a network configured to extract audio parameters, such as quality parameters, of the audio data. Formulated differently, to encode the audio data for provision of the one or more audio parameters may comprise to encode, using the encoder 12A, an audio signal comprised in the audio data using the first neural network for providing the one or more audio parameters. The uncertainty quantification determiner may comprise a signal feature extractor (not shown), e.g., comprised in the encoder 12A. In one or more example audio devices, to provide the one or more audio parameters comprises to extract one or more audio features from the audio data by using the signal feature extractor.

In one or more examples or embodiments, the audio device 10 is configured to map, such as using the one or more processors 10C, the one or more audio parameters to a first latent space of a first neural network for provision of a mapping parameter indicative of whether the one or more audio parameters belong to a training manifold of the first latent space. In one or more example audio devices, the audio device 10, such as the uncertainty quantification determiner 12, comprises an uncertainty parameter determiner 12B. In one or more examples or embodiments, the uncertainty parameter determiner 12B may be comprised in the comparator processor 13. The encoder 12A may be configured to output 56 the one or more audio parameters to the uncertainty parameter determiner 12B. The uncertainty parameter determiner 12B may be configured to map the one or more audio parameters to a first latent space of the first neural network for provision of the mapping parameter indicative of whether the one or more audio parameters belong to the training manifold of the first latent space. The audio device 10 is configured to determine, such as using the one or more processors 10C, an uncertainty parameter indicative of an uncertainty of processing quality. In one or more example audio devices, the uncertainty quantification determiner 12 is configured to determine, such as using the uncertainty parameter determiner 12B, the uncertainty parameter. The uncertainty quantification determiner 12 may be configured to determine, such as using the uncertainty parameter determiner 12B, the uncertainty parameter based on the input interface output 52, the mapping parameter, and/or the one or more audio parameters. The uncertainty quantification determiner 12 may be configured to output 55, such as using the uncertainty parameter determiner 12B, the uncertainty parameter, e.g., output to a signal processor 14.

The audio device 10 is configured to control the processing of the audio data for provision of the audio output based on the uncertainty parameter. In one or more example audio devices, the audio device 10, such as the one or more processors 10C, may comprise the signal processor 14.

In one or more example audio devices, the one or more processors 10C, such as the signal processor 14, comprises a digital signal processor 14B comprising a second neural network.

The audio device 10 is configured to process, such as using the signal processor 14, the audio data for provision of an audio output. In other words, the audio device 10 is configured to process, using the signal processor 14, the first microphone input signal 50, the second microphone input signal 72, the transceiver input signal 74, and/or the input interface output 52 for provision of the audio output.

In one or more example audio devices, to process the audio data for provision of an audio output comprises to provide the audio data as input to the second neural network, such as an input 52 to the digital signal processor 14B, and to process the audio data using the second neural network for provision of a primary output 66 based on the uncertainty parameter. For example, the digital signal processor 14B may be configured to process the audio data for provision of the primary output 66. Optionally, the digital signal processor 14B may be configured to process the audio data for provision of a feedback output 64. The digital signal processor 14B may be configured to output the feedback output 64 to a controller 14A. In other words, to process the audio data for provision of an audio output comprises to provide the audio data, such as the input interface output 52, as input to the signal processor 14 and to process the audio data using the signal processor 14, such as using the digital signal processor 14B, e.g., operating according to the second neural network. In one or more example audio devices, the signal processor 14 is configured to process the audio data for provision of the audio output based on the uncertainty parameter. In one or more example audio devices, the signal processor 14 is configured to control the processing of the audio data for provision of the audio output based on the uncertainty parameter. The signal processor 14 may be configured to receive the uncertainty parameter from the uncertainty quantification determiner 12, such as from the uncertainty parameter determiner 12B.

In one or more example audio devices, the second neural network comprises a deep neural network, DNN. In other words, the signal processor 14, such as the digital signal processor 14B, may comprise a DNN. For example, the signal processor 14, such as the digital signal processor 14B, may be configured to operate according the DNN.

In one or more example audio devices, the audio device 10, such as the one or more processors 10C, comprises a controller 14A. In one or more example audio devices, the signal processor 14, such as the digital signal processor 14B, comprises the controller 14A. The controller 14A may be configured to determine a controller output(s) 60, 61, 62, based on the uncertainty parameter. In other words, the controller 14A may be configured to receive the uncertainty parameter and to determine the controller output(s) 60, 61, 62 based on the uncertainty parameter.

In one or more example audio devices, to control the processing of the audio data for provision of the audio output comprises to control the processing of the audio data based on the controller output, such as one or more of controller outputs 60 61, 62. In other words, the controller output may be used as an input to the processing of the audio data for provision of the audio output. The controller 14A may be configured to use the uncertainty parameter, to determine the controller output(s) 60 61, 62. To determine the controller output 60 61, 62 may comprise to determine a processing scheme for the processing of the audio data. For example, the controller 14A may be configured to determine whether the audio data is to be processed more or less by the audio device 10, such as by the signal processor 14. In one or more example audio devices, the controller 14A may be configured to control the processing of the digital signal processor 14B based on the uncertainty parameter, such as based on the output 58.

In one or more example audio devices, the audio device 10, such as the one or more processors 10C, comprises a secondary processor 14D different from the digital signal processor 14B. The secondary processor 14D may be seen as an alternative processor, such as a secondary signal processor different from the digital signal processor 14B using the second neural network. For example, the secondary processor 14D may be configured to perform signal processing without using a neural network, e.g., using conventional signal processing instead.

In one or more example audio devices, to process the audio data for provision of an audio output comprises to process the audio data for provision of a secondary output 68 different from the primary output using the secondary processor, wherein the audio output is based on the secondary output. In one or more example audio devices, the secondary output is determined based on the uncertainty parameter. In other words, the secondary output may be used as an input to the processing of the audio data for provision of the audio output.

In one or more example audio devices, the controller 14A may be configured to control the processing of the digital signal processor 14B based on the uncertainty parameter, such as based on the output 58. For example, the controller 14A may be configured to control the processing of the digital signal processor 14B based on the uncertainty parameter by providing a controller output 62 to the digital signal processor 14B.

In one or more example audio devices, the controller 14A may be configured to control the processing of the secondary processor 14D based on the uncertainty parameter, such as based on the output 58. For example, the controller 14A may be configured to control the processing of the secondary processor 14D based on the uncertainty parameter by providing a controller output 61 to the secondary processor 14D.

In one or more example audio devices, the controller 14A may be configured to control the processing of a mixer 14C based on the uncertainty parameter, such as based on the output 58. For example, the controller 14A may be configured to control the processing of the mixer 14C based on the uncertainty parameter by providing a controller output 60 to the mixer 14C.

In one or more example audio devices, the audio device 10, such as the one or more processors 10C, comprise the mixer 14C. In other words, the signal processor 14 comprises the mixer 14C. In one or more example audio devices, the mixer 14C is configured to process the audio data for provision of an audio output comprises to mix the primary output 66 and the secondary output 68 for provision of a mixed output 70. In one or more example audio devices, to control the processing of the audio data may comprise to mix the primary output 66 and the secondary output 68 for provision of a mixed output 70. For example, the mixer 14C may be configured to combine the primary output 66 with the secondary output 68, e.g., with different weights, for provision of the mixed output 70. The mixer 14C may for example be configured to add the primary output 66 to the secondary output 68, e.g., with different weights, for provision of the mixed output 70. The controller 14A may be configured to control how the mixer 14C should mix the primary output 66 and the secondary output 68. For example, the mixer 14C may be configured to apply a mask-method partially.

In one or more example audio devices, the audio output is based on the mixed output 70. For example, the audio speaker input 78 and/or the second transceiver input 80 may be based on the mixed output 70.

It may be appreciated that the primary output 66 and/or the secondary output 68 may be outputted directly from the signal processor 14, such as outputted directly to the audio speaker 10D and/or the second transceiver 10G, e.g., via the output interface 10A. In other words, the primary output 66 and/or the secondary output 68 may be outputted directly from the signal processor 14 without going through the mixer 14C.

In one or more example audio devices, the audio output is based partly on the primary output 66 and partly on the secondary output 68. For example, a first part of the audio output is based on the primary output 66 and a second part of the audio output is based on the secondary output 68. In other words, the digital signal processor 14B may be configured to process sub-parts of the audio data for provision of the primary output 66 and/or the secondary processor 14D may be configured to process sub-parts of the audio data for provision of the secondary output 68.

In one or more example audio devices, the controller 14A may be configured to determine, based on the uncertainty parameter, which parts of the audio data are to be processed by digital signal processor 14B and which parts of the audio data are to be processed by the secondary processor 14D. By mixing the primary output 66 and secondary output 68, the audio device 10 may be configured to combine a conventional noise reduction with neural network approach.

In one or more example audio devices, the one or more processors 10C are configured to determine whether the uncertainty parameter satisfies a first criterion. In other words, the uncertainty quantification determiner and/or the signal processor 14 are configured to determine whether the uncertainty parameter satisfies a first criterion.

In other words, when the first criterion is satisfied, the uncertainty parameter is indicative of a low uncertainty of processing quality, such as indicative of a good reconstruction quality of the audio data. The first criterion may comprise a first threshold. In one or more example audio devices, in accordance with the uncertainty parameter satisfying the first criterion, the one or more processors 10C are configured to process the audio data according to a first signal processing scheme for provision of the audio output.

To process the audio data according to a first signal processing scheme for provision of the audio output may comprise to process the audio data using the digital signal processor 14B, such as using the second neural network, for provision of the audio output. In other words, the first signal processing scheme may comprise instructions instructing the audio device 10, such as signal processor 14, to process the audio data with the digital signal processor 14B using the second neural network, such as processing using only with the digital signal processor 14B, e.g., using only the DNN. The first signal processing scheme may be seen as the "normal" operation.

In one or more example audio devices, in accordance with the uncertainty parameter not satisfying the first criterion and/or in accordance with the uncertainty parameter satisfying a second criterion, the one or more processors 10C are configured to process the audio data according to a second signal processing scheme for provision of the audio output. In other words, the uncertainty quantification determiner and/or the signal processor 14 are configured to determine whether the uncertainty parameter satisfies a second criterion. The second criterion may be seen as a criterion indicating when the uncertainty parameter is indicative of a medium uncertainty of processing quality. In other words, when the second criterion is satisfied, the uncertainty parameter is indicative of a medium uncertainty of processing quality, such as indicative of a medium reconstruction quality of the audio data. To process the audio data according to a second signal processing scheme for provision of the audio output may comprise to process the audio data using a combination of the digital signal processor 14B, such as using the second neural network, and the secondary processor 14D for provision of the audio output. In other words, the second signal processing scheme may comprise instructions instructing the audio device 10, such as signal processor 14, to process the audio data with the digital signal processor 14B using a combination of the second neural network and the secondary processor 14D, such as processing using both the digital signal processor 14B, e.g., using the DNN, and the secondary processor 14D. The second signal processing scheme may be seen as a conservative operation.

In one or more example audio devices, in accordance with the uncertainty parameter not satisfying the first criterion and in accordance with the uncertainty parameter not satisfying the second criterion, the one or more processors 10C are configured to process the audio data according to a third signal processing scheme for provision of the audio output. When the first criterion and the second criterion are not satisfied, the uncertainty parameter may be indicative of a high uncertainty of processing quality. In other words, when the first criterion and the second criterion are not satisfied, the uncertainty parameter is indicative of a high uncertainty of processing quality, such as indicative of a poor reconstruction quality of the audio data. To process the audio data according to a third signal processing scheme for provision of the audio output may comprise to process the audio data using the secondary processor 14D for provision of the audio output. In other words, the third signal processing scheme may comprise instructions instructing the audio device 10, such as the signal processor 14, to process the audio data only with the secondary processor 14D. The third signal processing scheme may be seen as a very conservative operation.

For example, the audio speaker input 78 and/or the second transceiver input 80 may be based on the primary output 66 only. For example, the audio speaker input 78 and/or the second transceiver input 80 may be based on the secondary output 68 only.

Figure 2:
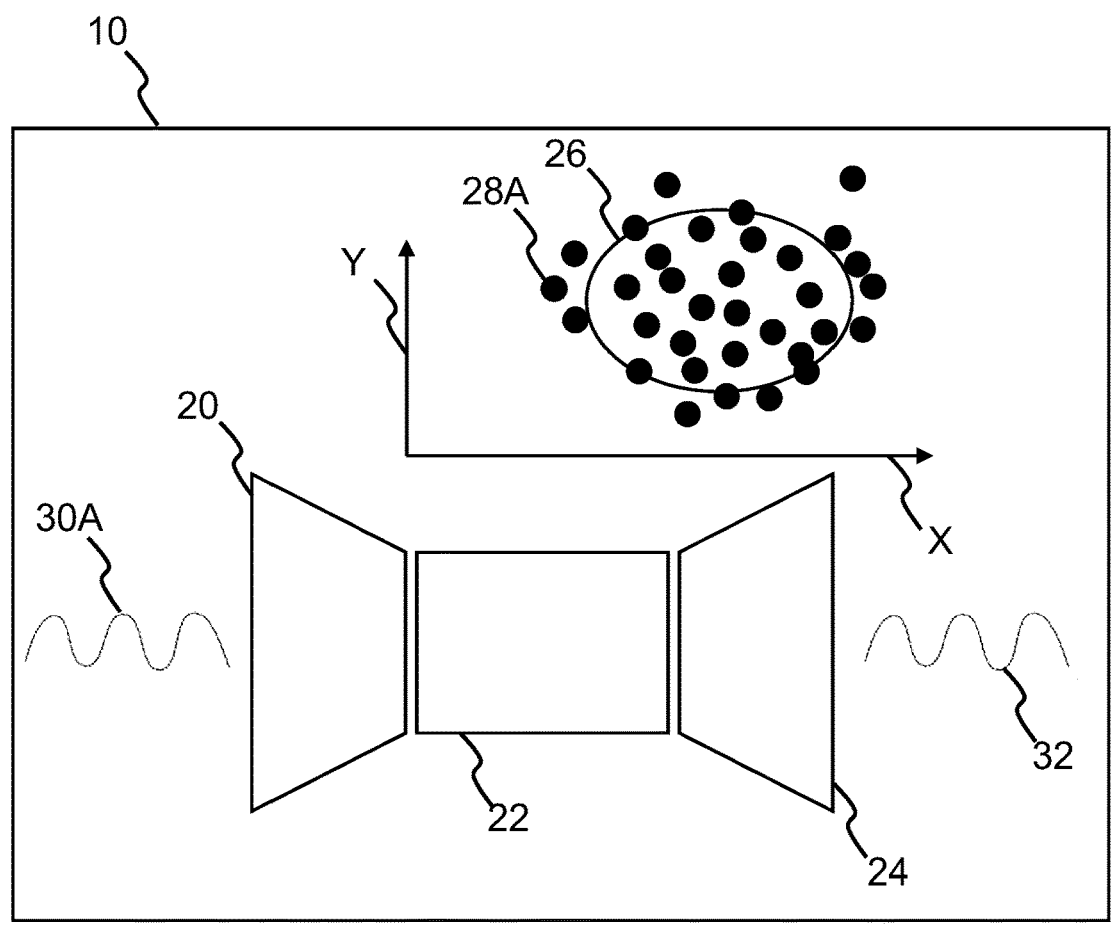
Figure 2:
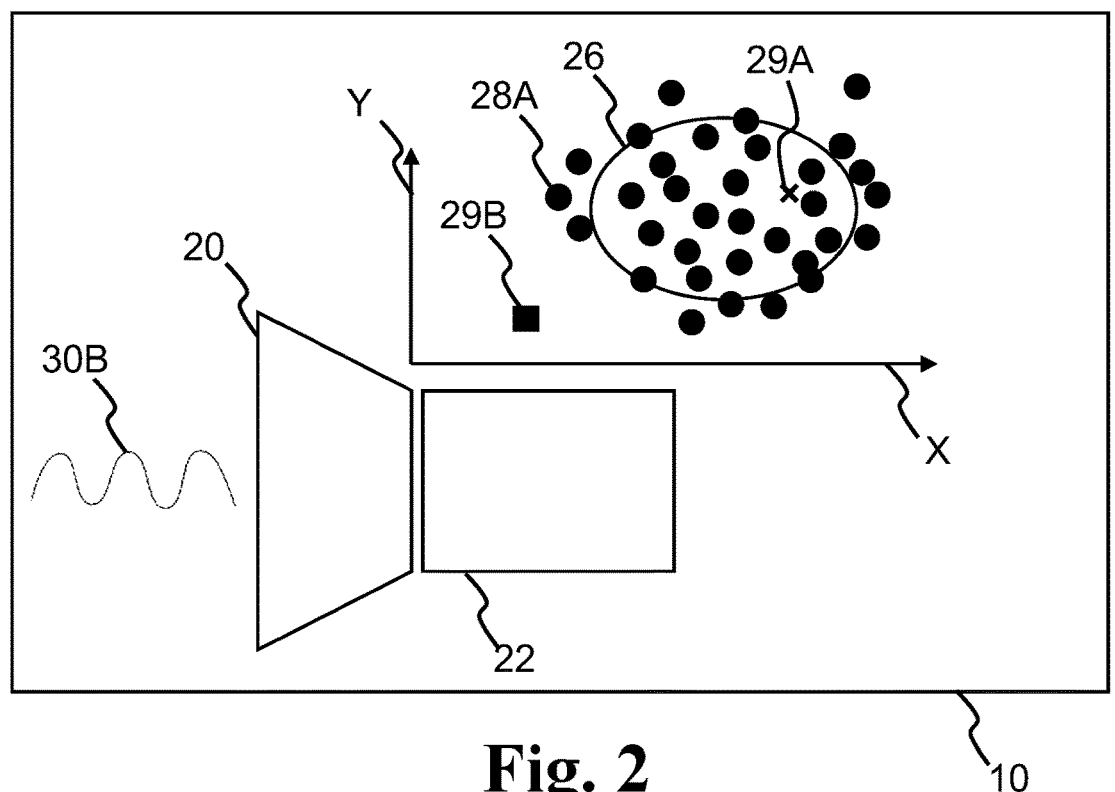

FIG. 2 schematically illustrates an example audio device, such as audio device 10, e.g., audio device 10 FIG. 1, according to the present disclosure where the technique disclosed herein is applied. The top figure in FIG. 2 illustrates an example training phase of the audio device 10 and the bottom figure in FIG. 2 illustrates an example operation phase of the audio device 10.

In the training phase, the audio device 10 is configured to obtain audio data, such as training audio data 30A. The audio device 10 may comprise an encoder 20. The encoder 20 may be configured to process the training audio data 30A for provision of one or more training audio parameters indicative of one or more characteristics of the training audio data. The encoder 20 may be comprised in an uncertainty quantification determiner, such as the uncertainty quantification determiner 12 of FIG. 1. The audio device 10 may comprise a first latent space 22. The first latent space 22 may comprise a first latent space representation. The first latent space representation may be seen as a mathematical representation of data, such as audio data, in a lower-dimensional space that captures the underlying structure and patterns of the data, such as audio data. The encoder 20 may comprise a first neural network. The encoder may be configured to operate according to the first neural network. The first neural network may be configured to operate according to a first machine learning model. It may be appreciated that the first neural network, has been trained based on training audio data 30A to provide the first latent space representation. For example, the first neural network has been trained based on a loss between the input to the encoder 20, such as the audio data, e.g., the training audio data 30A, and the output at the decoder 24. The audio device 10, such as the first neural network, may comprise an autoencoder, e.g., comprising the encoder 20 and/or the decoder 24, that is configured to generate the first latent space representation by training the first machine learning model based on the training audio data 30A for providing the first latent space 22. The audio device 10 may comprise a decoder 24 configured to process the training audio data 30A, e.g., using the first latent space 22, for provision of training audio outputs 32. In other words, the audio device 10, such as using the autoencoder, may be configured to compress high-dimensional data of the training audio data, such as highly complex training audio samples, into a lower-dimensional space, while preserving as much of the original information of the training audio data as possible. The first latent space may be seen as a compressed of the input data, e.g., being training audio data, that captures the representative features of the data in a more compact form. The first latent space may be seen as a low complexity encoded space based on the training audio data. The audio device 10 may be configured to generate a training manifold 26 in the first latent space 22 during the training phase. The first latent space is illustrated with an X-Y graph in the top figure.

The training manifold 26 of the first latent space 22 may be seen as the distribution of training data points in the high-dimensional input space that are used to train the first neural network to learn a lower-dimensional latent space. It may be appreciated that during training, the first neural network may be configured to learn to map each data point in the high-dimensional input space to a corresponding point in the lower-dimensional latent space. As may be seen on the graph, a first training data point 28A is illustrated on the graph. The training manifold 26 may be seen as the set of all these data points in the high-dimensional input space that are used to train the first neural network. In other words, the first latent space comprises a training manifold of first latent space parameters. The training manifold may be seen as the set of data points in the lower-dimensional latent space that have been matched to the set of data points in the high-dimensional input space. In one or more example audio devices, the training manifold 26 comprises a probability distribution. In other words, the training manifold 26 is defined by a probability distribution, such as a Gaussian. For example, each area of the training manifold 26 may comprise a plurality of training data points encoded by the encoder 20. Each area of the training manifold 26 may be associated with one or more audio parameters. In other words, each area of the training manifold 26 may be associated with a different audio parameter classified by the first machine learning model. As the first machine learning model gets trained, the first latent space may become more well-defined, and the areas defined in the training manifold 26 may form clusters of training data points encoded by the encoder. During training one or more vectors comprising a plurality of mean values and/or variance values may be created. The training manifold 26 may then be defined based on the plurality of mean values and/or variance values. The training manifold 26 may be defined based on the trained one or more vectors. The training manifold 26 may be defined based on one or more mean vectors comprising each comprising a plurality of mean values and/or one or more variance vectors each comprising a plurality of variance values. For example, the training manifold 26 may be defined based on maximum and/or minimum values of the mean values and/or the variance values. Alternatively or additionally, the training manifold 26 may be defined based on a percentile of the mean values and/or variance values. In the X-Y graph in FIG. 1 and the X-Y graph in FIG. 2, the X-axis may be seen as representative of the mean and the Y-axis representative of the variance.

In the operation phase, the audio device 10 is configured to obtain audio data 30B. The audio device 10 may comprise an encoder 20. The encoder 20 may be configured to process the audio data 30B for provision of one or more audio parameters indicative of one or more characteristics of the audio data 30B. The encoder 20 may be comprised in an uncertainty quantification determiner, such as the uncertainty quantification determiner 12 of FIG. 1. In the operation phase, the audio device 10 is configured to map the one or more audio parameters to a first latent space of a first latent space 22, such as first neural network, for provision of a mapping parameter indicative of whether the one or more audio parameters belong to a training manifold 26 of the first latent space. The first latent space is illustrated by the graph in the bottom figure of FIG. 2. The audio device 10 is configured to determine, based on the mapping parameter, an uncertainty parameter indicative of an uncertainty of processing quality.

In one or more example audio devices, the training manifold 26 comprises a probability distribution. In one or more example audio devices, to map the one or more audio parameters comprises to map the one or more audio parameters to the probability distribution for provision of the mapping parameter.

The bottom figure of FIG. 2 illustrates a first audio parameter 29A, such as a first encoded input audio, in the first latent space. As may be seen, the audio device 10 has determined that the first audio parameter 29A belongs to the training manifold 26.

The bottom figure of FIG. 2 illustrates a second audio parameter 29B, such as a second encoded input audio, in the first latent space. As may be seen, the audio device 10 has determined that the second audio parameter 29B is outside the training manifold 26.

In one or more example audio devices, to map the one or more audio parameters with a first latent space of a first neural network comprises to determine a distance between the one or more audio parameters and the training manifold 26. In other words, the audio device 10 may be configured to determine a first distance between the first audio parameter 29A and the training manifold 26 and/or to determine a second distance between the second audio parameter 29B and the training manifold 26. For example, the audio device 10 may be configured to whether the first audio parameter 29A is inside or outside a variance of the training manifold 26 and/or to determine whether the second audio parameter 29B is inside or outside a variance of the training manifold 26.

It may be appreciated that for the first audio parameter 29A the uncertainty parameter may satisfy a first criterion as disclosed herein since the first audio parameter 29A belongs to the training manifold 26. The audio device 10 may therefore process the audio data associated with the first audio parameter 29A according to a first signal processing scheme as disclosed herein.

It may be appreciated that for the second audio parameter 29A the uncertainty parameter may not satisfy the first criterion as disclosed herein since the second audio parameter 29B does not belong to the training manifold 26. The audio device 10 may therefore process the audio data associated with the second audio parameter 29B according to a second signal processing scheme or a third signal processing scheme as disclosed herein.

Figure 3A:
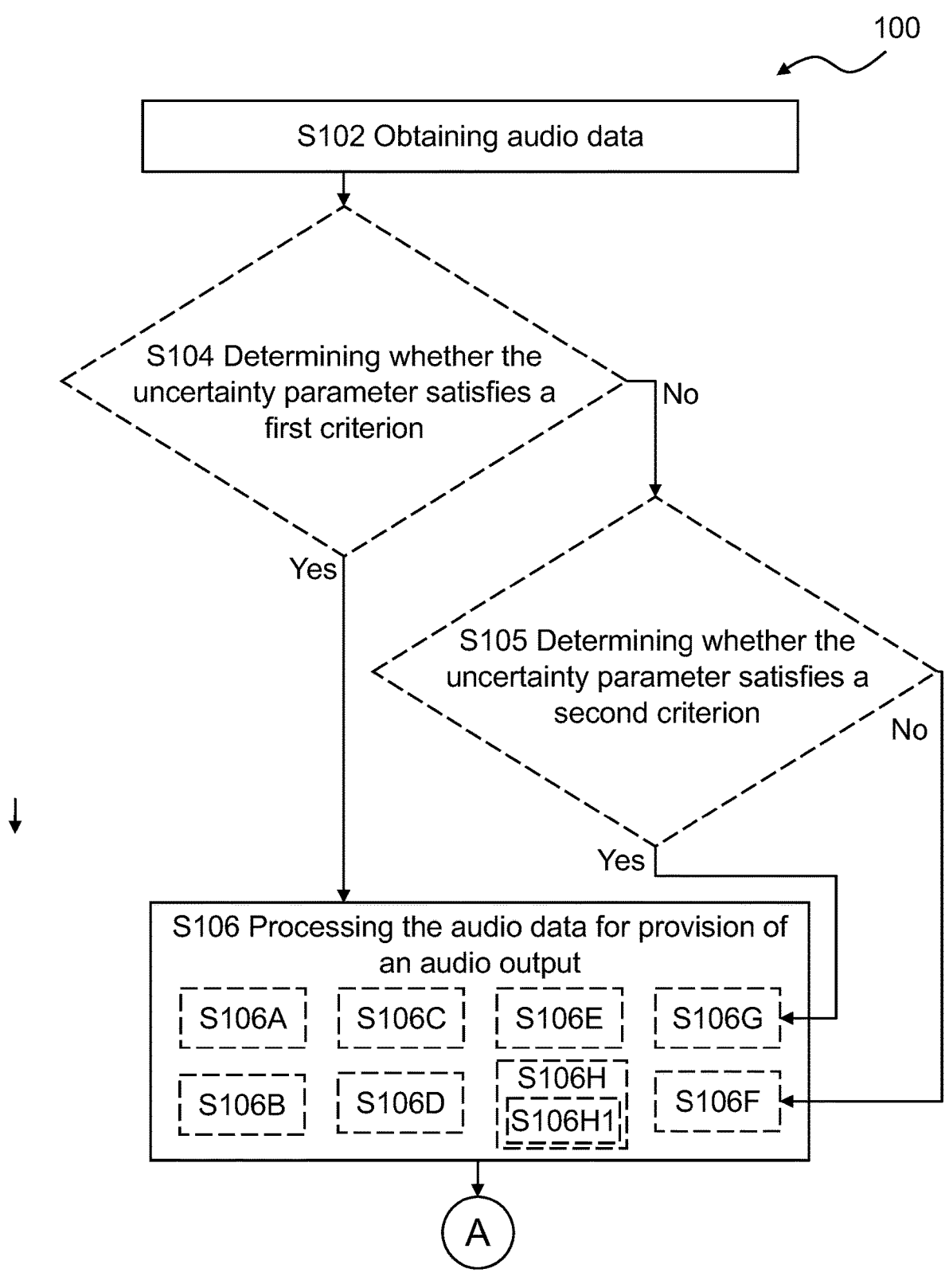
FIGS. 3A-3C shows a flow chart of an example method according to the present disclosure.
Figure 3B:
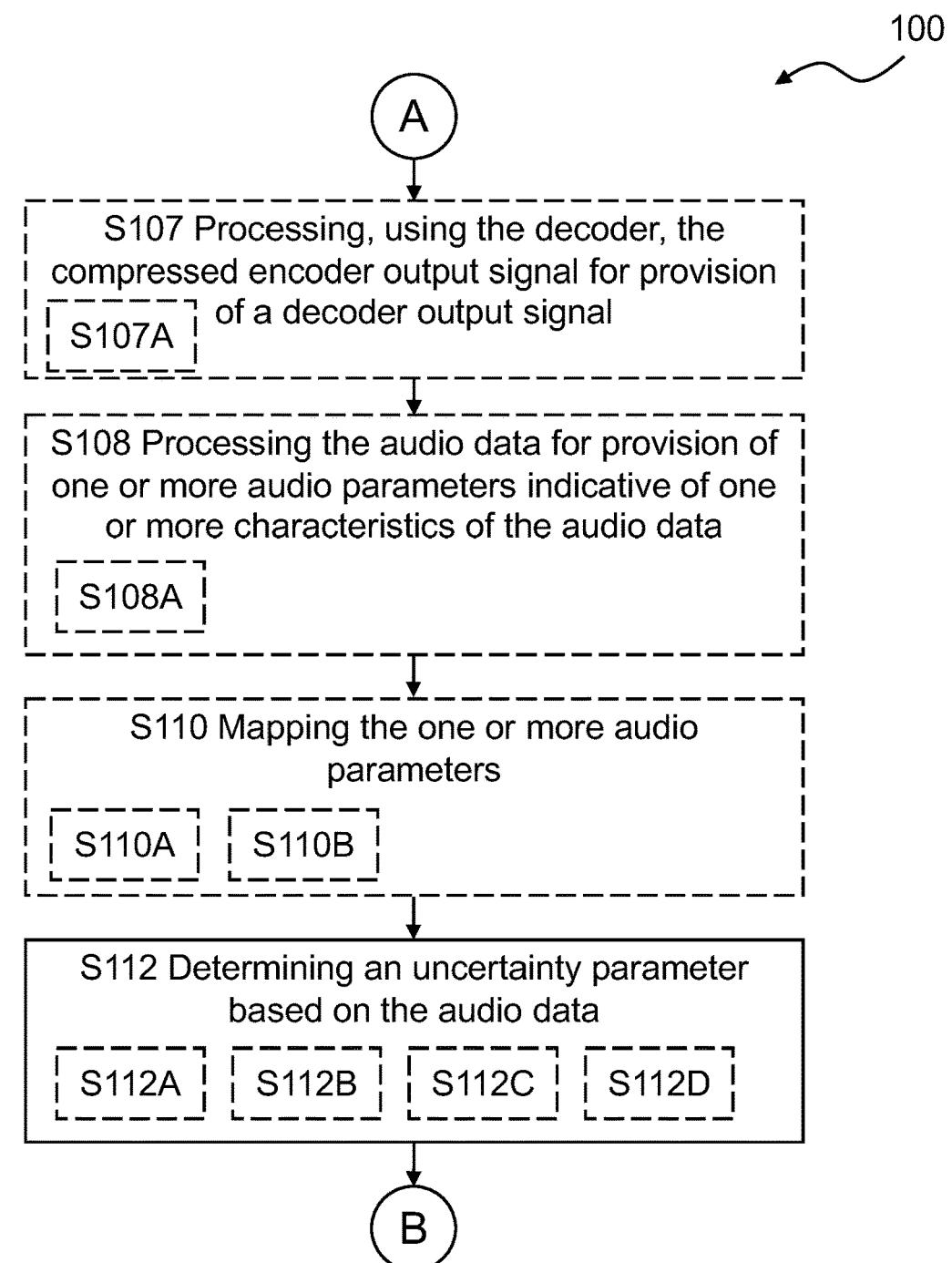

The audio device 10 may be configured to perform any of the methods disclosed in FIGS. 3A-3B.

The processor 10C is configured to perform any of the operations disclosed in FIG. 3A-3B (such as any one or more of S012, S104, S105, S106, S106A, S106B, S106C, S106D, S106E, S106F, S106G, S108, S108A, S110, S110A, S110B, S112, S114, S114A, S116).

The operations of the audio device 10 may be embodied in the form of executable logic routines (for example, lines of code, software programs, etc.) that are stored on a non-transitory computer readable medium (for example, memory) and are executed by the one or more processors 10C).

Furthermore, the operations of the audio device 10 may be considered a method that the audio device 10 is configured to carry out. Also, while the described functions and operations may be implemented in software, such functionality may as well be carried out via dedicated hardware or firmware, or some combination of hardware, firmware and/or software.

Memory of the audio device may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor 10C. The memory may exchange data with the processor 10C over a data bus. Control lines and an address bus between the memory and the processor 10C also may be present (not shown in FIG. 1). The memory is considered a non-transitory computer readable medium.

The memory may be configured to store information such as training audio data, audio data, latent space s, training manifolds, mapping parameters, and/or uncertainty parameters as disclosed herein in a part of the memory.

Figure 3C:
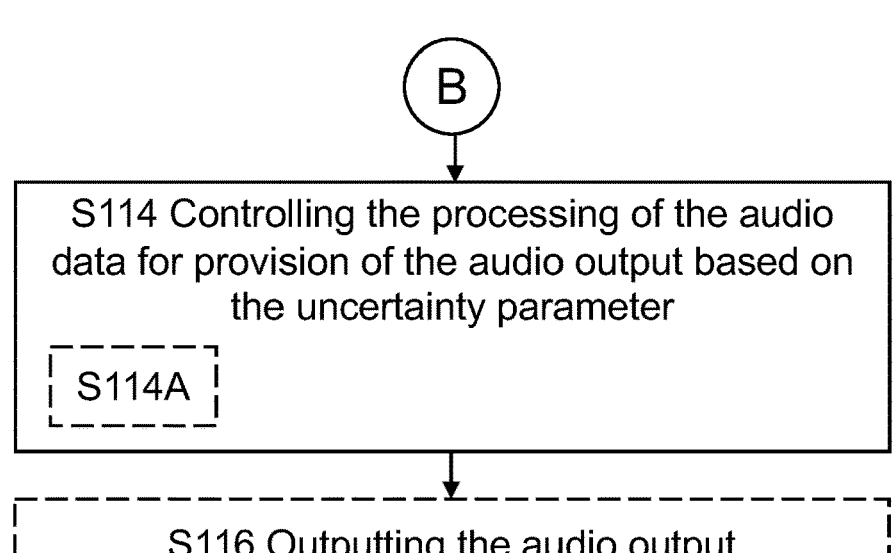

FIGS. 3A-3C show a flow diagram of an example method, such as a method 100.

A method 100 of operating an audio device, such as an audio device configured to act as a receiver device, is disclosed. The method 100 comprises obtaining S102, such as via an interface and/or using one or more processors of the audio device, audio data.

The method 100 comprises processing S106, such as using one or more processors of the audio device, the audio data for provision of an audio output.

In one or more example methods, the method 100 comprises processing S108, such as using one or more processors of the audio device, the audio data for provision of one or more audio parameters indicative of one or more characteristics of the audio data.

In one or more example methods, the method 100 comprises mapping S110, such as using one or more processors of the audio device, the one or more audio parameters to a first latent space of a first neural network for provision of a mapping parameter indicative of whether the one or more audio parameters belong to a training manifold of the first latent space.

In one or more example methods, processing S106 the audio data for provision of an audio output comprises processing S106H, using the encoder, the audio data for provision of a compressed encoder output signal.

In one or more example methods, the method 100 comprises processing S107, using the decoder, the compressed encoder output signal for provision of a decoder output signal.

In one or more example methods, processing S106H the audio data for provision of the compressed encoder output signal comprises encoding S106H1 the audio data.

In one or more example methods, processing S107 the compressed encoder output signal comprises decoding S107A the compressed encoder output signal for provision of the decoder output signal.

The method 100 comprises determining S112 an uncertainty parameter based on the audio data.

In one or more example methods, determining S112 an uncertainty parameter based on the audio data comprises determining S112C an uncertainty parameter based on the audio data and the decoder output signal by comparing the audio data and the decoder output signal.

In one or more example methods, determining S112 an uncertainty parameter comprises determining S112D the uncertainty parameter using the comparator processor.

In one or more example methods, the method 100 comprises determining S112A, such as using one or more processors of the audio device, based on the mapping parameter, an uncertainty parameter indicative of an uncertainty of processing quality.

In one or more example methods, the method 100 comprises determining S112B an uncertainty parameter based on the audio data and the decoder output signal by comparing the audio data and the decoder output signal.

The method 100 comprises controlling S114, such as using one or more processors of the audio device, the processing of the audio data for provision of the audio output based on the uncertainty parameter.

In one or more example methods, processing S108 the audio data for provision of one or more audio parameters comprises encoding S108A, such as using one or more processors of the audio device, the audio data for provision of the one or more audio parameters using the first neural network.

In one or more example methods, processing S106 the audio data for provision of an audio output comprises providing S106A, such as using one or more processors of the audio device, the audio data as input to a second neural network and processing S106B, such as using one or more processors of the audio device, the audio data using the second neural network for provision of a primary output based on the uncertainty parameter, and wherein the audio output is based on the primary output.

In one or more example methods, controlling S114 the processing of the audio data for provision of the audio output comprises controlling S114A, such as using one or more processors of the audio device, the processing of the audio data based on the controller output.

In one or more example methods, processing S106 the audio data for provision of an audio output comprises processing S106C, such as using one or more processors of the audio device, the audio data for provision of a secondary output different from the primary output using the secondary processor, wherein the audio output is based on the secondary output.

In one or more example methods, processing S106 the audio data for provision of an audio output comprises mixing S106D, such as using one or more processors of the audio device, the primary output and the secondary output for provision of a mixed output, and wherein the audio output is based on the mixed output.

In one or more example methods, the training manifold comprises a probability distribution, and wherein mapping S110 the one or more audio parameters comprises mapping S110A, such as using one or more processors of the audio device, the one or more audio parameters to the probability distribution for provision of the mapping parameter.

In one or more example methods, mapping S110 the one or more audio parameters comprises determining S110B, such as using one or more processors of the audio device, a distance between the one or more audio parameters and the training manifold.

In one or more example methods, the method 100 comprises determining S104, such as using one or more processors of the audio device, whether the uncertainty parameter satisfies a first criterion, and in accordance with the uncertainty parameter satisfying the first criterion, processing S106E, such as using one or more processors of the audio device, the audio data according to a first signal processing scheme for provision of the audio output.

In one or more example methods, the method 100 comprises determining S105, such as using one or more processors of the audio device, whether the uncertainty parameter satisfies a second criterion, and in accordance with the uncertainty parameter not satisfying the first criterion and/or in accordance with the uncertainty parameter satisfying a second criterion, processing S106F, such as using one or more processors of the audio device, the audio data according to a second signal processing scheme for provision of the audio output.

In one or more example methods, the method 100 comprises, in accordance with the uncertainty parameter not satisfying the first criterion and in accordance with the uncertainty parameter not satisfying the second criterion, processing S106G, such as using one or more processors of the audio device, the audio data according to a third signal processing scheme for provision of the audio output.

In one or more example methods, the method 100 comprises outputting S116, such as via the interface and/or using one or more processors of the audio device, the audio output.

Examples of audio devices, systems, and methods according to the disclosure are set out in the following items:

Item A1. An audio device comprising memory, an interface, and one or more processors, wherein the one or more processors are configured to:

obtain audio data;

process the audio data for provision of an audio output;

process the audio data for provision of one or more audio parameters indicative of one or more characteristics of the audio data;

map the one or more audio parameters to a first latent space of a first neural network for provision of a mapping parameter indicative of whether the one or more audio parameters belong to a training manifold of the first latent space; determine, based on the mapping parameter, an uncertainty parameter indicative of an uncertainty of processing quality; and control the processing of the audio data for provision of the audio output based on the uncertainty parameter.

Item A2. The audio device according to item A1, wherein to process the audio data for provision of one or more audio parameters comprises to encode the audio data for provision of the one or more audio parameters using the first neural network.

Item A3. The audio device according to any of the previous items, wherein the one or more processors comprise a digital signal processor comprising a second neural network, and wherein to process the audio data for provision of an audio output comprises to provide the audio data as input to the second neural network and to process the audio data using the second neural network for provision of a primary output based on the uncertainty parameter, and wherein the audio output is based on the primary output.

Item A4. The audio device according to item A3, wherein the second neural network comprises a deep neural network.

Item A5. The audio device according to any of items A3-A4, wherein the digital signal processor comprises a controller configured to determine a controller output based on the uncertainty parameter and wherein to control the processing of the audio data for provision of the audio output comprises to control the processing of the audio data based on the controller output.

Item A6. The audio device according to any of items A3-A5, wherein the one or more processors comprise a secondary processor different from the digital signal processor, wherein to process the audio data for provision of an audio output comprises to process the audio data for provision of a secondary output different from the primary output using the secondary processor, wherein the audio output is based on the secondary output.

Item A7. The audio device according to any of items A3-A6, wherein the one or more processors comprise a mixer, and wherein to process the audio data for provision of an audio output comprises to mix the primary output and the secondary output for provision of a mixed output, and wherein the audio output is based on the mixed output.

Item A8. The audio device according to any of the previous items, wherein the training manifold comprises a probability distribution, and wherein to map the one or more audio parameters comprises to map the one or more audio parameters to the probability distribution for provision of the mapping parameter.

Item A9. The audio device according to any of the previous items, wherein to map the one or more audio parameters with a first latent space of a first neural network comprises to determine a distance between the one or more audio parameters and the training manifold.

Item A10. The audio device according to any of the previous items, wherein the one or more processors are configured to:

determine whether the uncertainty parameter satisfies a first criterion, and in accordance with the uncertainty parameter satisfying the first criterion, process the audio data according to a first signal processing scheme for provision of the audio output.

Item A11. The audio device according to item A10, wherein the one or more processors are configured to: in accordance with the uncertainty parameter not satisfying the first criterion and/or in accordance with the uncertainty parameter satisfying a second criterion, process the audio data according to a second signal processing scheme for provision of the audio output.

Item A12. The audio device according to item A11, wherein the one or more processors are configured to: in accordance with the uncertainty parameter not satisfying the first criterion and in accordance with the uncertainty parameter not satisfying the second criterion, process the audio data according to a third signal processing scheme for provision of the audio output.

Item A13. The audio device according to any of the previous items, wherein the one or more processors are configured to output the audio output via the interface.

Item A14. Method (100) of operating an audio device, the method comprising:

obtaining (S102) audio data;

processing (S106) the audio data for provision of an audio output;

processing (S108) the audio data for provision of one or more audio parameters indicative of one or more characteristics of the audio data;

mapping (S110) the one or more audio parameters to a first latent space of a first neural network for provision of a mapping parameter indicative of whether the one or more audio parameters belong to a training manifold of the first latent space;

determining (S112A), based on the mapping parameter, an uncertainty parameter indicative of an uncertainty of processing quality; and controlling (S114) the processing of the audio data for provision of the audio output based on the uncertainty parameter.

Item A15. The method (100) according to item A14, wherein processing (S108) the audio data for provision of one or more audio parameters comprises encoding (S108A) the audio data for provision of the one or more audio parameters using the first neural network.

Item A16. The method (100) according to any of items A14-A15, wherein processing (S106) the audio data for provision of an audio output comprises providing (S106A) the audio data as input to a second neural network and processing (S106B) the audio data using the second neural network for provision of a primary output based on the uncertainty parameter, and wherein the audio output is based on the primary output.

Item A17. The method (100) according to item A16, wherein the second neural network comprises a deep neural network.

Item A18. The method (100) according to any of items A16-A17, wherein controlling (S114) the processing of the audio data for provision of the audio output comprises controlling (S114A) the processing of the audio data based on the controller output.

Item A19. The method (100) according to any of items A16-A18, wherein processing (S106) the audio data for provision of an audio output comprises processing (S106C) the audio data for provision of a secondary output different from the primary output using the secondary processor, wherein the audio output is based on the secondary output.

Item A20. The method (100) according to any of items A16-A19, wherein processing (S106) the audio data for provision of an audio output comprises mixing (S106D) the primary output and the secondary output for provision of a mixed output, and wherein the audio output is based on the mixed output.

Item A21. The method (100) according to any of items A14-A20, wherein the training manifold comprises a probability distribution, and wherein mapping (S110) the one or more audio parameters comprises mapping (S110A) the one or more audio parameters to the probability distribution for provision of the mapping parameter.

Item A22. The method (100) according to any of items A14-A21, wherein mapping (S110) the one or more audio parameters comprises determining (S110B) a distance between the one or more audio parameters and the training manifold.

Item A23. The method (100) according to any of items A14-A22, wherein the method (100) comprises determining (S104) whether the uncertainty parameter satisfies a first criterion, and in accordance with the uncertainty parameter satisfying the first criterion, processing (S106E) the audio data according to a first signal processing scheme for provision of the audio output.

Item A24. The method (100) according to item A23, wherein the method (100) comprises determining (S105) whether the uncertainty parameter satisfies a second criterion, in accordance with the uncertainty parameter not satisfying the first criterion and/or in accordance with the uncertainty parameter satisfying a second criterion, processing (S106F) the audio data according to a second signal processing scheme for provision of the audio output.

Item A25. The method (100) according to item A23, wherein the method (100) comprises, in accordance with the uncertainty parameter not satisfying the first criterion and in accordance with the uncertainty parameter not satisfying the second criterion, processing (S106G) the audio data according to a third signal processing scheme for provision of the audio output.

Item A26. The method (100) according to any of items A14-A25, wherein the method (100) comprises outputting (S116) the audio output.

Item B1. An audio device comprising a memory, an interface, and one or more processors, wherein the one or more processors are configured to:

obtain audio data;

process the audio data for provision of an audio output;

determine an uncertainty parameter based on the audio data; and control the processing of the audio data for provision of the audio output based on the uncertainty parameter.

Item B2. The audio device according to item B1, wherein the one or more processors comprise an encoder and a decoder, wherein to process the audio data for provision of an audio output comprises to process, using the encoder, the audio data for provision of a compressed encoder output signal, and wherein the one or more processors are configured:

to process, using the decoder, the compressed encoder output signal for provision of a decoder output signal; and wherein to determine an uncertainty parameter based on the audio data comprises to determine an uncertainty parameter based on the audio data and the decoder output signal by comparing the audio data and the decoder output signal.

Item B3. The audio device according to item B2, wherein to process the audio data for provision of the compressed encoder output signal comprises to encode the audio data, and wherein to process the compressed encoder output signal comprises to decode the compressed encoder output signal for provision of the decoder output signal.

Item B4. The audio device according to any of items B1-B3, wherein the one or more processors comprise a comparator processor, and wherein to determine the uncertainty parameter comprises to determine the uncertainty parameter using the comparator processor.

Item B5. The audio device according to any of items B1-B4, wherein the one or more processors comprise an autoencoder, and wherein the autoencoder comprises the encoder and the decoder.

Item B6. The audio device according to any of items B1-B5, wherein the one or more processors comprise a digital signal processor comprising a second neural network, and wherein to process the audio data for provision of an audio output comprises to provide the audio data as input to the second neural network and to process the audio data using the second neural network for provision of a primary output based on the uncertainty parameter, and wherein the audio output is based on the primary output.

Item B7. The audio device according to item B6, wherein the second neural network comprises a deep neural network.

Item B8. The audio device according to any of item B6-B7, wherein the digital signal processor comprises a controller configured to determine a controller output based on the uncertainty parameter and wherein to control the processing of the audio data for provision of the audio output comprises to control the processing of the audio data based on the controller output.

Item B9. The audio device according to any of items B6-B8, wherein the one or more processors comprise a secondary processor different from the digital signal processor, wherein to process the audio data for provision of an audio output comprises to process the audio data for provision of a secondary output different from the primary output using the secondary processor, wherein the audio output is based on the secondary output.

Item B10. The audio device according to any of item B6-B9, wherein the one or more processors comprise a mixer, and wherein to process the audio data for provision of an audio output comprises to mix the primary output and the secondary output for provision of a mixed output, and wherein the audio output is based on the mixed output.

Item B11. The audio device according to any of items B1-B10, wherein the one or more processors are configured to:

determine whether the uncertainty parameter satisfies a first criterion, and in accordance with the uncertainty parameter satisfying the first criterion, process the audio data according to a first signal processing scheme for provision of the audio output.

Item B12. The audio device according to item B11, wherein the one or more processors are configured to: in accordance with the uncertainty parameter not satisfying the first criterion and/or in accordance with the uncertainty parameter satisfying a second criterion, process the audio data according to a second signal processing scheme for provision of the audio output.

Item B13. The audio device according to item B12, wherein the one or more processors are configured to: in accordance with the uncertainty parameter not satisfying the first criterion and in accordance with the uncertainty parameter not satisfying the second criterion, process the audio data according to a third signal processing scheme for provision of the audio output.

Item B14. The audio device according to any of items B1-B13, wherein the one or more processors are configured to output the audio output via the interface.

Item B15. Method (100) of operating an audio device, the method comprising:

obtaining (S102) audio data;

processing (S106) the audio data for provision of an audio output;

determining (S112) an uncertainty parameter based on the audio data; and controlling (S114) the processing of the audio data for provision of the audio output based on the uncertainty parameter.

Item B16. The method (100) according to item B15, wherein processing (S106) the audio data for provision of an audio output comprises processing (S106H), using the encoder, the audio data for provision of a compressed encoder output signal, and wherein the method comprising:

processing (S107), using the decoder, the compressed encoder output signal for provision of a decoder output signal, and wherein determining (S112) an uncertainty parameter based on the audio data comprises determining (S112C) an uncertainty parameter based on the audio data and the decoder output signal by comparing the audio data and the decoder output signal.

Item B17. The method (100) according to item B16, wherein processing (S106H) the audio data for provision of the compressed encoder output signal comprises encoding (S106H1) the audio data, and wherein processing (S107) the compressed encoder output signal comprises decoding (S107A) the compressed encoder output signal for provision of the decoder output signal.

Item B18. The method (100) according to any of items B15-B17, wherein determining (S112) the uncertainty parameter comprises determining (S112D) the uncertainty parameter using the comparator processor.

Item B19. The method (100) according to any of items B15-B18, wherein processing (S106) the audio data for provision of an audio output comprises providing (S106A) the audio data as input to a second neural network and processing (S106B) the audio data using the second neural network for provision of a primary output based on the uncertainty parameter, and wherein the audio output is based on the primary output.

Item B20. The method (100) according to item B19, wherein the second neural network comprises a deep neural network.

Item B21. The method (100) according to any of items B19-B20, wherein controlling (S114) the processing of the audio data for provision of the audio output comprises controlling (S114A) the processing of the audio data based on the controller output.

Item B22. The method (100) according to any of items B19-B21, wherein processing (S106) the audio data for provision of an audio output comprises processing (S106C) the audio data for provision of a secondary output different from the primary output using the secondary processor, wherein the audio output is based on the secondary output.

Item B23. The method (100) according to any of items B19-B22, wherein processing (S106) the audio data for provision of an audio output comprises mixing (S106D) the primary output and the secondary output for provision of a mixed output, and wherein the audio output is based on the mixed output.

Item B24. The method (100) according to any of items B15-B23, wherein the method (100) comprises determining (S104) whether the uncertainty parameter satisfies a first criterion, and in accordance with the uncertainty parameter satisfying the first criterion, processing (S106E) the audio data according to a first signal processing scheme for provision of the audio output.

Item B25. The method (100) according to item B24, wherein the method (100) comprises determining (S105) whether the uncertainty parameter satisfies a second criterion, in accordance with the uncertainty parameter not satisfying the first criterion and/or in accordance with the uncertainty parameter satisfying a second criterion, processing (S106F) the audio data according to a second signal processing scheme for provision of the audio output.

Item B26. The method (100) according to item B24, wherein the method (100) comprises, in accordance with the uncertainty parameter not satisfying the first criterion and in accordance with the uncertainty parameter not satisfying the second criterion, processing (S106G) the audio data according to a third signal processing scheme for provision of the audio output.

Item B27. The method (100) according to any of items B15-B26, wherein the method (100) comprises outputting (S116) the audio output.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

It is to be noted that the word "comprising" does not necessarily exclude the presence of other elements or steps than those listed.

It is to be noted that the words "a" or "an" preceding an element do not exclude the presence of a plurality of such elements.

It is to be noted that the term "indicative of" may be seen as "associated with", "related to", "descriptive of", "characterizing", and/or "defining". The terms "indicative of", "associated with" "related to", "descriptive of", "characterizing", and "defining" can be used interchangeably. The term "indicative of" can be seen as indicating a relation. For example, weight data indicative of weight may comprise one or more weight parameters.

It is to be noted that the word "based on" may be seen as "as a function of" and/or "derived from". The terms "based on" and "as a function of" can be used interchangeably. For example, a parameter determined "based on" a data set can be seen as a parameter determined "as a function of" the data set. In other words, the parameter may be an output of one or more functions with the data set as an input.

A function may be characterizing a relation between an input and an output, such as mathematical relation, a database relation, a hardware relation, logical relation, and/or other suitable relations.

It should further be noted that any reference signs do not limit the scope of the claims, that the examples may be implemented at least in part by means of both hardware and software, and that several "means", "units" or "devices" may be represented by the same item of hardware.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES

10 audio device
10A output interface
10B input interface
10C one or more processors
10D audio speaker
10E1 first microphone
10E2 second microphone
10F first wireless transceiver
10G second wireless transceiver
12 uncertainty quantification determiner, autoencoder
12A encoder
12B uncertainty parameter determiner
12C decoder
13 comparator processor
14 signal processor
14A controller
14B digital signal processor
14C mixer
14D secondary processor
16 first transceiver interface
18 second transceiver interface
20 encoder
22 first latent space
24 decoder
26 training manifold
28A first training data point
29A first audio parameter
29B second audio parameter
30A training audio data
30B audio data
32 training audio outputs
50 first microphone input signal
52 input interface output, encoder input signal
55 output, uncertainty parameter determiner output
56 to output, compressed encoder output signal
57 decoder output signal
58 output
60 controller output
61 controller output
62 controller output
64 feedback output
66 primary output
68 secondary output
70 mixed output
72 second microphone input signal
74 transceiver input signal
76 transceiver interface output
78 audio speaker input
80 second transceiver input
82 second transceiver output
100 Method of operating an audio device
S102 Obtaining audio data S104 Determining whether the uncertainty parameter satisfies a first criterion S105 Determining whether the uncertainty parameter satisfies a second criterion S106 Processing the audio data for provision of an audio output S106A Providing the audio data as input to a second neural network S106B Processing the audio data using the second neural network S106C Processing the audio data for provision of a secondary output S106D Mixing the primary output and the secondary output S106E Processing the audio data according to a first signal processing scheme S106F Processing the audio data according to a second signal processing scheme S106G Processing the audio data according to a third signal processing scheme S106H Processing, using the encoder, the audio data for provision of a compressed encoder output signal S106H1 Encoding the audio data S107 Processing, using the decoder, the compressed encoder output signal for provision of a decoder output signal S108 Processing the audio data for provision of one or more audio parameters S108A Encoding the audio data S110 Mapping the one or more audio parameters S110A Mapping the one or more audio parameters to the probability distribution S110B Determining a distance S112 Determining an uncertainty parameter S114 Controlling the processing of the audio data S114A Controlling the processing of the audio data S116 Obtaining the audio output

The invention claimed is:

1. An audio device comprising a memory, an interface, and one or more processors comprising an encoder and a decoder, wherein the one or more processors are configured to:

obtain audio data;

process the audio data for provision of an audio output, wherein to process the audio data for provision of an audio output comprises to process, using the encoder, the audio data for provision of a compressed encoder output signal;

process, using the decoder, the compressed encoder output signal for provision of a decoder output signal;

determine an uncertainty parameter based on the audio data, wherein to determine an uncertainty parameter based on the audio data comprises to determine an uncertainty parameter based on the audio data and the decoder output signal by comparing the audio data and the decoder output signal; and control the processing of the audio data for provision of the audio output based on the uncertainty parameter.

2. The audio device according to claim 1, wherein to process the audio data for provision of the compressed encoder output signal comprises to encode the audio data, and wherein to process the compressed encoder output signal comprises to decode the compressed encoder output signal for provision of the decoder output signal.

3. The audio device according to claim 1, wherein the one or more processors comprise a comparator processor, and wherein to determine the uncertainty parameter comprises to determine the uncertainty parameter using the comparator processor.

4. The audio device according to claim 1, wherein the one or more processors comprise an autoencoder, and wherein the autoencoder comprises the encoder and the decoder.

5. The audio device according to claim 1, wherein the one or more processors comprise a digital signal processor comprising a neural network, and wherein to process the audio data for provision of an audio output comprises to provide the audio data as input to the neural network and to process the audio data using the neural network for provision of a primary output based on the uncertainty parameter, and wherein the audio output is based on the primary output.

6. The audio device according to claim 5, wherein the neural network comprises a deep neural network.

7. The audio device according to claim 5, wherein the digital signal processor comprises a controller configured to determine a controller output based on the uncertainty parameter and wherein to control the processing of the audio data for provision of the audio output comprises to control the processing of the audio data based on the controller output.

8. The audio device according to claim 5, wherein the one or more processors comprise a secondary processor different from the digital signal processor, wherein to process the audio data for provision of an audio output comprises to process the audio data for provision of a secondary output different from the primary output using the secondary processor, wherein the audio output is based on the secondary output.

9. The audio device according to claim 8, wherein the one or more processors comprise a mixer, and wherein to process the audio data for provision of an audio output comprises to mix the primary output and the secondary output for provision of a mixed output, and wherein the audio output is based on the mixed output.

10. The audio device according to claim 1, wherein the one or more processors are configured to:

determine whether the uncertainty parameter satisfies a first criterion, and in accordance with the uncertainty parameter satisfying the first criterion, process the audio data according to a first signal processing scheme for provision of the audio output.

11. The audio device according to claim 10, wherein the one or more processors are configured to: in accordance with the uncertainty parameter not satisfying the first criterion and/or in accordance with the uncertainty parameter satisfying a second criterion, process the audio data according to a second signal processing scheme for provision of the audio output.

12. The audio device according to claim 11, wherein the one or more processors are configured to: in accordance with the uncertainty parameter not satisfying the first criterion and in accordance with the uncertainty parameter not satisfying the second criterion, process the audio data according to a third signal processing scheme for provision of the audio output.

13. The audio device according to claim 1, wherein the one or more processors are configured to output the audio output via the interface.

14. A method of operating an audio device comprising one or more processors comprising an encoder and a decoder, the method comprising:

obtaining audio data;

processing the audio data for provision of an audio output, wherein processing the audio data for provision of an audio output comprises processing, using the encoder, the audio data for provision of a compressed encoder output signal;

processing, using the decoder, the compressed encoder output signal for provision of a decoder output signal;

determining an uncertainty parameter based on the audio data, wherein determining an uncertainty parameter based on the audio data comprises determining an uncertainty parameter based on the audio data and the decoder output signal by comparing the audio data and the decoder output signal; and controlling the processing of the audio data for provision of the audio output based on the uncertainty parameter.

15. The method of claim 14, wherein processing the audio data for provision of one or more audio parameters comprises encoding the audio data for provision of the one or more audio parameters using a neural network.

16. The method of claim 14, wherein processing the audio data for provision of an audio output comprises providing the audio data as input to a neural network and processing the audio data using the neural network for provision of a primary output based on the uncertainty parameter, and wherein the audio output is based on the primary output.

17. The method of claim 16, wherein the neural network comprises a deep neural network.

18. The method of claim 14, wherein controlling the processing of the audio data for provision of the audio output comprises controlling the processing of the audio data based on the controller output.

19. The method of claim 16, wherein processing the audio data for provision of an audio output comprises processing the audio data for provision of a secondary output different from the primary output using a secondary processor, wherein the audio output is based on the secondary output.

* * * * *